United States Patent
Hayashi et al.

(10) Patent No.: US 9,168,911 B2
(45) Date of Patent: Oct. 27, 2015

(54) DRIVE CONTROL DEVICE FOR HYBRID VEHICLE

(75) Inventors: Koji Hayashi, Aichi-gun (JP); Masato Terashima, Toyota (JP); Hiroyasu Harada, Toyota (JP); Tomohito Ono, Gotenba (JP); Hiroyuki Ishii, Nisshin (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/366,635

(22) PCT Filed: Dec. 19, 2011

(86) PCT No.: PCT/JP2011/079422
§ 371 (c)(1),
(2), (4) Date: Jun. 18, 2014

(87) PCT Pub. No.: WO2013/094005
PCT Pub. Date: Jun. 27, 2013

(65) Prior Publication Data
US 2014/0316631 A1 Oct. 23, 2014

(51) Int. Cl.
*B60L 9/00* (2006.01)
*B60W 10/12* (2012.01)
(Continued)

(52) U.S. Cl.
CPC ............... *B60W 10/12* (2013.01); *B60K 6/365* (2013.01); *B60K 6/387* (2013.01); *B60K 6/445* (2013.01);
(Continued)

(58) Field of Classification Search
None
See application file for complete search history.

(56) References Cited

U.S. PATENT DOCUMENTS 5,923,093 A * 7/1999 Tabata et al. ............... 290/40 C
6,409,623 B1 * 6/2002 Hoshiya et al. .............. 475/5
(Continued)

FOREIGN PATENT DOCUMENTS

AU 2011373822 A1 2/2014
JP 2005-199942 A 7/2005
(Continued)

OTHER PUBLICATIONS

William Strunk, Jr., and E. B. White, "The Elements of Style", 3rd Edition, 1979, all pages.*

*Primary Examiner* — Calvin Cheung
(74) *Attorney, Agent, or Firm* — Sughrue Mion, PLLC

(57) ABSTRACT

A drive control device for a hybrid vehicle which is provided with: a first differential mechanism and a second differential mechanism which have a total of five rotary elements; and an engine, a first electric motor, a second electric motor and an output rotary member which are respectively connected to four rotary elements of said five rotary elements, and which has at least a first drive mode and a second drive mode in which the engine is operated and which are established by selectively connecting a rotary element of said five rotary elements which is connected to said engine, and a rotary element of said five rotary elements which is not connected to any of said engine, said first electric motor, said second electric motor and said output rotary member, to each other through a clutch, or selectively fixing the rotary element connected to said engine and the rotary element not connected to any of said engine, said first electric motor, said second electric motor and said output rotary member, to a stationary member through a brake, the drive control device comprising: a drive mode control portion configured to place the hybrid vehicle selectively in the first drive mode in which said engine is operated, in an engaged state of said brake and in a released state of said clutch, and the second drive mode in which said engine is operated, in a released state of said brake and in an engaged state of said clutch, said drive control portion inhibiting the hybrid vehicle from being placed in said second drive mode when an operating point of said engine lies in a predetermined region, and permitting the hybrid vehicle to be placed in said first drive mode when the operating point of the engine lies in said predetermined region.

6 Claims, 10 Drawing Sheets

(51) Int. Cl.
- *B60K 6/365* (2007.10)
- *B60K 6/445* (2007.10)
- *F02D 29/02* (2006.01)
- *B60W 20/00* (2006.01)
- *B60K 6/387* (2007.10)
- *B60W 10/06* (2006.01)
- *B60K 6/38* (2007.10)
- *F02N 11/08* (2006.01)

(52) U.S. Cl.
CPC ........... *B60W 10/06* (2013.01); *B60W 20/1084* (2013.10); *B60W 20/20* (2013.01); *F02D 29/02* (2013.01); *B60K 2006/381* (2013.01); *F02N 11/0814* (2013.01); *Y02T 10/6239* (2013.01); *Y10S 903/93* (2013.01)

(56) References Cited

U.S. PATENT DOCUMENTS

| | | | | |
|---|---|---|---|---|
| 6,637,530 | B1* | 10/2003 | Endo et al. | 180/65.25 |
| 7,198,123 | B2* | 4/2007 | Imazu et al. | 180/65.25 |
| 7,404,460 | B2* | 7/2008 | Oshidari | 180/65.235 |
| 2003/0094816 | A1* | 5/2003 | Kazama | 290/40 C |
| 2004/0134698 | A1* | 7/2004 | Yamamoto et al. | 180/65.2 |
| 2005/0113203 | A1* | 5/2005 | Mueller et al. | 475/223 |
| 2005/0159861 | A1* | 7/2005 | Iwatsuki et al. | 701/22 |
| 2006/0086545 | A1* | 4/2006 | Ito et al. | 180/65.2 |
| 2006/0289212 | A1* | 12/2006 | Haruhisa | 180/65.2 |
| 2008/0122391 | A1 | 5/2008 | Iwase et al. | |
| 2008/0190675 | A1* | 8/2008 | Itoh et al. | 180/65.2 |
| 2008/0305924 | A1* | 12/2008 | Soliman et al. | 477/5 |
| 2009/0075779 | A1* | 3/2009 | Kumazaki et al. | 477/3 |
| 2009/0112439 | A1* | 4/2009 | Kuang et al. | 701/99 |
| 2009/0250278 | A1* | 10/2009 | Kawasaki et al. | 180/65.275 |
| 2010/0203996 | A1* | 8/2010 | Kawai et al. | 475/5 |
| 2010/0324762 | A1* | 12/2010 | Imaseki et al. | 701/22 |
| 2011/0111906 | A1* | 5/2011 | Kim et al. | 475/5 |
| 2011/0120788 | A1* | 5/2011 | Wang et al. | 180/65.23 |
| 2011/0160015 | A1* | 6/2011 | Ren et al. | 475/5 |
| 2012/0108386 | A1* | 5/2012 | Wakashiro et al. | 477/5 |
| 2012/0208671 | A1* | 8/2012 | Zhu et al. | 477/5 |
| 2013/0005529 | A1* | 1/2013 | Chen et al. | 477/4 |
| 2013/0006489 | A1 | 1/2013 | Kim | |
| 2014/0194238 | A1* | 7/2014 | Ono et al. | 475/5 |
| 2015/0087458 | A1* | 3/2015 | Harada et al. | 475/5 |

FOREIGN PATENT DOCUMENTS

| | | |
|---|---|---|
| JP | 2006-077859 A | 3/2006 |
| JP | 2008-143348 A | 6/2008 |
| JP | 2008-265600 A | 11/2008 |
| JP | 2011-156997 A | 8/2011 |
| WO | 2009/038058 A1 | 3/2009 |
| WO | 2013/014777 A1 | 1/2013 |

\* cited by examiner

|  | BK | CL | MODE |
|---|---|---|---|
| EV-1 | O |  | 1 |
| EV-2 | O | O | 2 |
| HV-1 | O |  | 3 |
| HV-2 |  | O | 4 |
| HV-3 |  |  | 5 |

DRIVE CONTROL DEVICE FOR HYBRID VEHICLE

CROSS REFERENCE TO RELATED APPLICATIONS

This application is a National Stage of International Application No. PCT/JP2011/079422, filed Dec. 19, 2011, the contents of all of which are incorporated herein by reference in their entirety.

TECHNICAL FIELD

The present invention relates to an improvement of a drive control device for a hybrid vehicle.

BACKGROUND ART

There is known a hybrid vehicle which has at least one electric motor in addition to an engine such as an internal combustion engine, which functions as a vehicle drive power source. Patent Document 1 discloses an example of such a hybrid vehicle, which is provided with an internal combustion engine, a first electric motor and a second electric motor. This hybrid vehicle is further provided with a brake which is configured to fix an output shaft of the above-described internal combustion engine to a stationary member, and an operating state of which is controlled according to a running condition of the hybrid vehicle, so as to improve energy efficiency of the hybrid vehicle and to permit the hybrid vehicle to run according to a requirement by an operator of the hybrid vehicle.

PRIOR ART DOCUMENT

Patent Document

Patent Document 1: JP-2008-265600 A1

SUMMARY OF THE INVENTION

Object Achieved by the Invention

According to the conventional arrangement of the hybrid vehicle described above, however, there is a risk of generation of a booming noise or deterioration of vibrations of the hybrid vehicle, when frequency of a rotary motion pulsation of the engine is coincident with the resonance frequency of a power transmitting system in the hybrid vehicle while an operating point of the engine lies in a predetermined range. This problem was first discovered by the present inventors in the process of intensive studies in an attempt to improve the performance of the hybrid vehicle.

The present invention was made in view of the background art described above. It is therefore an object of the present invention to provide a drive control device for a hybrid vehicle, which permits reduction of generation of noises and vibrations of the hybrid vehicle.

Means for Achieving the Object

The object indicated above is achieved according to a first aspect of the present invention, which provides a drive control device for a hybrid vehicle which is provided with: a first differential mechanism and a second differential mechanism which have a total of five rotary elements; and an engine, a first electric motor, a second electric motor and an output rotary member which are respectively connected to four rotary elements of the above-described five rotary elements, and which has at least a first drive mode and a second drive mode in which the engine is operated and which are established by selectively connecting a rotary element of the above-described five rotary elements which is connected to the above-described engine, and a rotary element of the above-described five rotary elements which is not connected to any of the above-described engine, first electric motor, second electric motor and output rotary member, to each other through a clutch, or selectively fixing the rotary element connected to the above-described engine, and the rotary element not connected to any of the above-described engine, first electric motor, second electric motor and output rotary member, to a stationary member through a brake, the drive control device being characterized by placing the hybrid vehicle selectively in the first drive mode in which the above-described engine is operated, in an engaged state of the above-described brake and in a released state of the above-described clutch, and the second drive mode in which the above-described engine is operated, in a released state of the above-described brake and in an engaged state of the above-described clutch, and inhibiting the hybrid vehicle from being placed in the above-described second drive mode when an operating point of the above-described engine lies in a predetermined region, and permitting the hybrid vehicle to be placed in the above-described first drive mode when the operating point of the engine lies in the above-described predetermined region.

Advantages of the Invention

According to the first aspect of the invention described above, the hybrid vehicle which is provided with: a first differential mechanism and a second differential mechanism which have a total of five rotary elements; and an engine, a first electric motor, a second electric motor and an output rotary member which are respectively connected to four rotary elements of the above-described five rotary elements, and which has at least a first drive mode and a second drive mode in which the engine is operated and which are established by selectively connecting a rotary element of the above-described five rotary elements which is connected to the above-described engine, and a rotary element of the above-described five rotary elements which is not connected to any of the above-described engine, first electric motor, second electric motor and output rotary member, to each other through a clutch, or selectively fixing the rotary element connected to the above-described engine, and the rotary element not connected to any of the above-described engine, first electric motor, second electric motor and output rotary member, to a stationary member through a brake. The drive control device places the hybrid vehicle selectively in the first drive mode in which the above-described engine is operated, in the engaged state of the above-described brake and in the released state of the above-described clutch, and the second drive mode in which the above-described engine is operated, in the released state of the above-described brake and in the engaged state of the above-described clutch, and inhibits the hybrid vehicle from being placed in the above-described second drive mode when the operating point of the above-described engine lies in the predetermined region, but permits the hybrid vehicle to be placed in the above-described first drive mode when the operating point of the engine lies in the above-described predetermined region. Thus, the drive control device is configured to select the drive mode so as to reduce generation of noises and vibrations, while taking account of different conditions of an inertia balance depending upon operating states of the above-described clutch and brake. Namely, the present invention provides the drive control device for the hybrid vehicle, which permits reduction of generation of noises and vibrations of the hybrid vehicle.

According to a second aspect of the invention, the drive control device according to the above-described first aspect of the invention is configured such that the above-described predetermined region is a region of the operating point of the above-described engine in which noises and/or vibrations generated due to an operation of the engine while the hybrid vehicle is placed in the above-described second drive mode. According to this second aspect of the invention, it is possible to suitably and practically set the region in which the hybrid vehicle is inhibited from being placed in the above-described second drive mode, in order to reduce generation of the noises and vibrations.

According to a third aspect of the invention, the drive control device according to the above-described first or second aspect of the invention is configured to control an operation of the above-described engine such that the operating point of the engine lies outside the above-described predetermined region, where the hybrid vehicle is permitted to be placed in the above-described second drive mode. According to this third aspect of the invention, it is possible to suitably reduce generation of the noises and vibrations due to the operation of the above-described engine where the hybrid vehicle is permitted to be placed in the above-described second drive mode.

The object indicated above is also achieved according to a fourth aspect of the invention, which provides a drive control device for a hybrid vehicle which is provided with: a first differential mechanism and a second differential mechanism which have a total of five rotary elements; and an engine, a first electric motor, a second electric motor and an output rotary member which are respectively connected to four rotary elements of the above-described five rotary elements, and which has at least a first drive mode and a second drive mode in which the engine is operated and which are established by selectively connecting a rotary element of the above-described five rotary elements which is connected to the above-described engine, and a rotary element of the above-described five rotary elements which is not connected to any of the above-described engine, first electric motor, second electric motor and output rotary member, to each other through a clutch, or selectively fixing the rotary element connected to the above-described engine, and the rotary element not connected to any of the above-described engine, first electric motor, second electric motor and output rotary member, to a stationary member through a brake, the drive control device being characterized by placing the hybrid vehicle selectively in the first drive mode in which the above-described engine is operated, in an engaged state of the above-described brake and in a released state of the above-described clutch, and the second drive mode in which the above-described engine is operated, in a released state of the above-described brake and in an engaged state of the above-described clutch, and controlling the hybrid vehicle during forward running thereof such that the hybrid vehicle is placed in the above-described first drive mode and the above-described second drive mode in respective different regions of an operating point of the engine. Thus, the drive control device is configured to select the drive mode so as to reduce generation of noises and vibrations, while taking account of different conditions of an inertia balance depending upon the operating states of the above-described clutch and brake. Namely, the present invention provides the drive control device for the hybrid vehicle, which permits reduction of generation of noises and vibrations of the hybrid vehicle.

MODE FOR CARRYING OUT THE INVENTION

Figure 1:
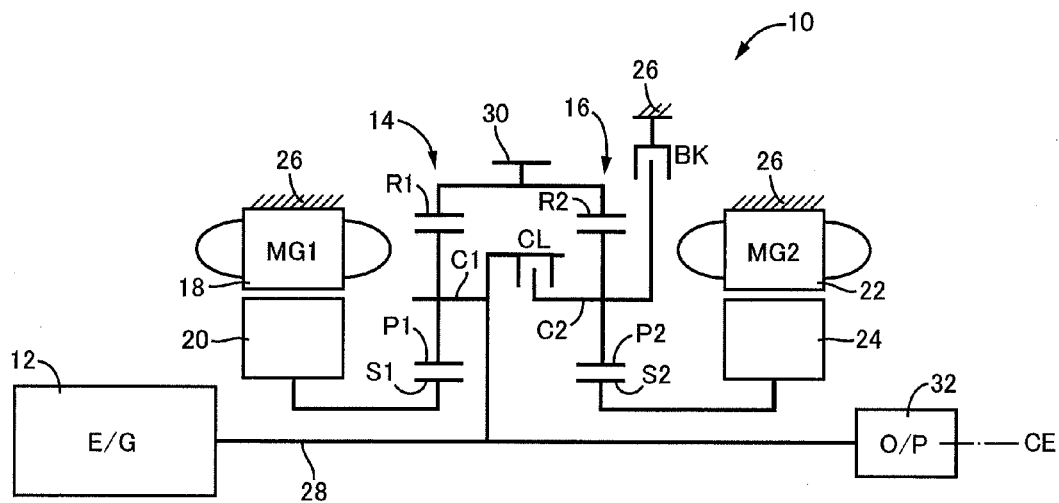
FIG. 1 is a schematic view for explaining an arrangement of a hybrid vehicle drive system to which the present invention is suitably applicable.

In one preferred form of the present invention, the above-described clutch and brake are hydraulically operated coupling devices the operating states (engaged and released states) of which are controlled according to a hydraulic pressure. While wet multiple-disc type frictional coupling devices are preferably used as the clutch and brake, meshing type coupling devices, namely, so-called dog clutches (claw clutches) may also be used. Alternatively, the clutch and brake may be electromagnetic clutches, magnetic powder clutches and any other clutches the operating states of which are controlled (which are engaged and released) according to electric commands.

The drive system to which the present invention is applicable is placed in a selected one of a plurality of drive modes, depending upon the operating states of the above-described clutch and brake. Preferably, EV drive modes in which the above-described engine is halted and at least one of the above-described first and second electric motors is used as a vehicle drive power source include a mode 1 to be established in the engaged state of the brake and in the released state of the clutch, and a mode 2 to be established in the engaged states of both of the clutch and brake. Further, hybrid drive modes in which the above-described engine is operated while the above-described first and second electric motors are operated to generate a vehicle drive force and/or an electric energy when needed include a mode 3, corresponding to the first drive mode in the present invention, to be established in the engaged state of the brake and in the released state of the clutch, a mode 4, corresponding to the second drive mode in the present invention, to be established in the released state of the brake and the engaged state of the clutch, and a mode 5 to be established in the released states of both of the brake and clutch.

In another preferred form of the invention, the rotary elements of the above-described first differential mechanism, and the rotary elements of the above-described second differential mechanism are arranged as seen in the collinear charts, in the engaged state of the above-described clutch and in the released state of the above-described brake, in the order of the first rotary element of the first differential mechanism, the first rotary element of the second differential mechanism, the second rotary element of the first differential mechanism, the second rotary element of the second differential mechanism, the third rotary element of the first differential mechanism, and the third rotary element of the second differential mechanism, where the rotating speeds of the second rotary elements and the third rotary elements of the first and second differential mechanisms are indicated in mutually overlapping states in the collinear charts.

Referring to the drawings, preferred embodiments of the present invention will be described in detail. It is to be understood that the drawings referred to below do not necessarily accurately represent ratios of dimensions of various elements.

First Embodiment

FIG. 1 is the schematic view for explaining an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common center axis CE. The drive system 10 is constructed substantially symmetrically with respect to the center axis CE. In FIG. 1, a lower half of the drive system 10 is not shown. This description applies to other embodiments which will be described.

The engine 12 is an internal combustion engine such as a gasoline engine, which is operable to generate a drive force by combustion of a fuel such as a gasoline injected into its cylinders. Each of the first electric motor MG1 and second electric motor MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio $\rho 1$ and which is provided with rotary elements (elements) consisting of: a first rotary element in the form of a sun gear S1; a second rotary element in the form of a carrier C1 supporting a pinion gear P1 such the pinion gear P1 is rotatable about its axis and the axis of the planetary gear set; and a third rotary element in the form of a ring gear R1 meshing with the sun gear S1 through the pinion gear P1. The second planetary gear set 16 is a single-pinion type planetary gear set which has a gear ratio $\rho 2$ and which is provided with rotary elements (elements) consisting of: a first rotary element in the form of a sun gear S2; a second rotary element in the form of a carrier C2 supporting a pinion gear P2 such the pinion gear P2 is rotatable about its axis and the axis of the planetary gear set; and a third rotary element in the form of a ring gear R2 meshing with the sun gear S2 through the pinion gear P2.

The sun gear S1 of the first planetary gear set 14 is connected to the rotor 20 of the first electric motor MG1. The carrier C1 of the first planetary gear set 14 is connected to an input shaft 28 which is rotated integrally with a crankshaft of the engine 12. This input shaft 28 is rotated about the center axis CE. In the following description, the direction of extension of this center axis CE will be referred to as an "axial direction", unless otherwise specified. The ring gear R1 of the first planetary gear set 14 is connected to an output rotary member in the form of an output gear 30, and to the ring gear R2 of the second planetary gear set 16. The sun gear S2 of the second planetary gear set 16 is connected to the rotor 24 of the second electric motor MG2.

The drive force received by the output gear 30 is transmitted to a pair of left and right drive wheels (not shown) through a differential gear device not shown and axles not shown. On the other hand, a torque received by the drive wheels from a roadway surface on which the vehicle is running is transmitted (input) to the output gear 30 through the differential gear device and axles, and to the drive system 10. A mechanical oil pump 32, which is a vane pump, for instance, is connected to one of opposite end portions of the input shaft 28, which one end portion is remote from the engine 12. The oil pump 32 is operated by the engine 12, to generate a hydraulic pressure to be applied to a hydraulic control unit 60, etc. which will be described. An electrically operated oil pump which is driven by electric energy can be installed in addition to the oil pump 32.

Between the carrier C1 of the first planetary gear set 14 and the carrier C2 of the second planetary gear set 16, there is disposed a clutch CL which is configured to selectively couple these carriers C1 and C2 to each other (to selectively connect the carriers C1 and C2 to each other or disconnect the carriers C1 and C2 from each other). Between the carrier C2 of the second planetary gear set 16 and the stationary member in the form of the housing 26, there is disposed a brake BK which is configured to selectively couple (fix) the carrier C2 to the housing 26. Each of these clutch CL and brake BK is a hydraulically operated coupling device the operating state of which is controlled (which is engaged and released) according to the hydraulic pressure applied thereto from the hydraulic control unit 60. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from an electronic control device 40.

As shown in FIG. 1, the drive system 10 is configured such that the first planetary gear set 14 and second planetary gear set 16 are disposed coaxially with the input shaft 28 (disposed on the center axis CE), and opposed to each other in the axial direction of the center axis CE. Namely, the first planetary gear set 14 is disposed on one side of the second planetary gear set 16 on a side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16 which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16 are interposed between the first electric motor MG1 and second electric motor MG2. That is, the drive system 10 is configured such that the first electric motor MG1, first planetary gear set 14, clutch CL, second planetary gear set 16, brake BK and second electric motor MG2 are disposed coaxially with each other, in the order of description from the side of the engine 12, in the axial direction of the center axis CE.

Figure 2:
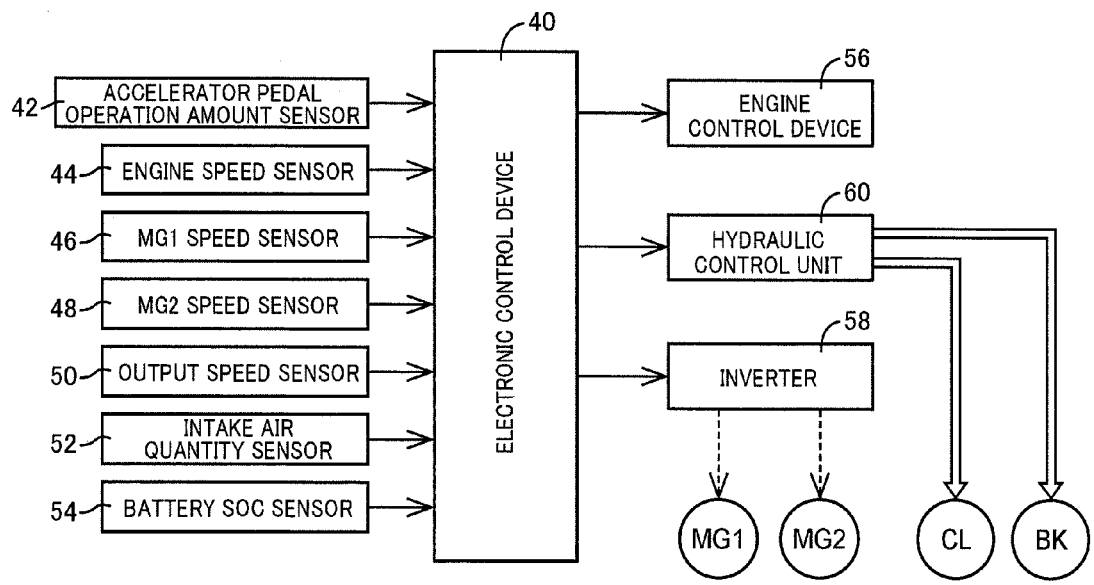
FIG. 2 is a view for explaining major portions of a control system provided to control the drive system of FIG. 1.

FIG. 2 is the view for explaining major portions of a control system provided to control the drive system 10. The electronic control device 40 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first electric motor MG1 and second electric motor MG2. In the present embodiment, the electronic control device 40 corresponds to a drive control device for a hybrid vehicle having the drive system 10. The electronic control device 40 may be constituted by mutually independent control units as needed for respective controls such as an output control of the engine 12 and drive controls of the first electric motor MG1 and second electric motor MG2.

As indicated in FIG. 2, the electronic control device 40 is configured to receive various signals from sensors and switches provided in the drive system 10. Namely, the electronic control device 40 receives: an output signal of an accelerator pedal operation amount sensor 42 indicative of an operation amount or angle $A_{CC}$ of an accelerator pedal (not shown), which corresponds to a vehicle output required by a vehicle operator; an output signal of an engine speed sensor 44 indicative of an engine speed $N_E$, that is, an operating speed of the engine 12; an output signal of an MG1 speed sensor 46 indicative of an operating speed $N_{MG1}$ of the first electric motor MG1; an output signal of an MG2 speed sensor 48 indicative of an operating speed $N_{MG2}$ of the second electric motor MG2; an output signal of an output speed sensor 50 indicative of a rotating speed $N_{OUT}$ of the output gear 30, which corresponds to a running speed V of the vehicle; an output signal of an intake air quantity sensor 52 indicative of an intake air quantity $Q_A$ of the engine 12; and an output signal of a battery SOC sensor 54 indicative of an electric energy amount SOC stored in (a state of charge SOC of) a battery not shown.

The electronic control device 40 is also configured to generate various control commands to be applied to various portions of the drive system 10. Namely, the electronic control device 40 applies to an engine control device 56 for controlling an output of the engine 12, following engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 40 applies command signals to an inverter 58, for controlling operations of the first electric motor MG1 and second electric motor MG2, so that the first and second electric motors MG1 and MG2 are operated with electric energies supplied thereto from a battery through the inverter 58 according to the command signals to control outputs (output torques) of the electric motors MG1 and MG2. Electric energies generated by the first and second electric motors MG1 and M2 are supplied to and stored in the battery through the inverter 58. Further, the electronic control device 40 applies command signals for controlling operating states of the clutch CL and brake BK, to linear solenoid valves and other electromagnetic control valves provided in the hydraulic control unit 60, so that hydraulic pressures generated by those electromagnetic control valves are controlled to control the operating states of the clutch CL and brake BK.

An operating state of the drive system 10 is controlled through the first electric motor MG1 and second electric motor MG2, such that the drive system 10 functions as an electrically controlled differential portion whose difference of input and output speeds is controllable. For example, an electric energy generated by the first electric motor MG1 is supplied to the battery or the second electric motor MG2 through the inverter 58. Namely, a major portion of a drive force of the engine 12 is mechanically transmitted to the output gear 30, while the remaining portion of the drive force is consumed by the first electric motor MG1 operating as the electric generator, and converted into the electric energy, which is supplied to the second electric motor MG2 through the inverter 58, so that the second electric motor MG2 is operated to generate a drive force to be transmitted to the output gear 30. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
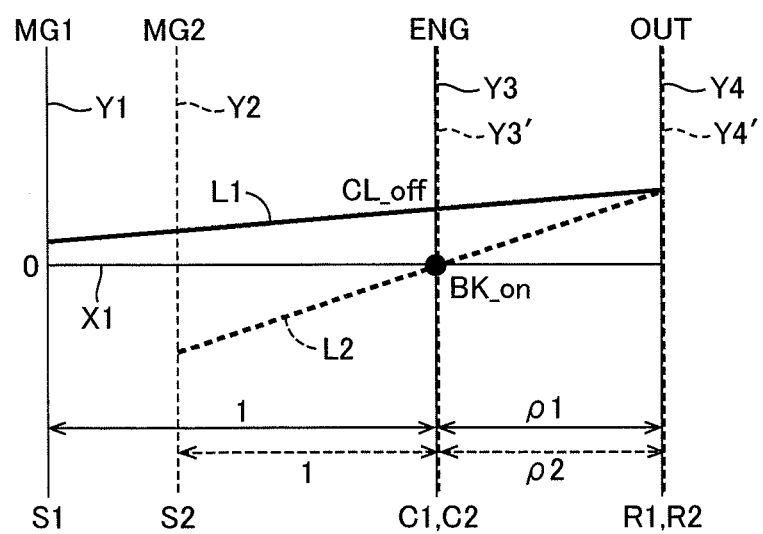
FIG. 3 is a table indicating combinations of operating states of a clutch and a brake, which correspond to respective five drive modes of the drive system of FIG. 1.
FIG. 4 is a collinear chart having straight lines which permit indication thereon of relative rotating speeds of various rotary elements of the drive system of FIG. 1, the collinear chart corresponding to the modes 1 and 3 of FIG. 3.

In the hybrid vehicle provided with the drive system 10 constructed as described above, one of a plurality of drive modes is selectively established according to the operating states of the engine 12, first electric motor MG1 and second electric motor MG2, and the operating states of the clutch CL and brake BK. FIG. 3 is the table indicating combinations of the operating states of the clutch CL and brake BK, which correspond to the respective five drive modes of the drive system 10. In this table, "o" marks represent an engaged state while blanks represent a released state. The drive modes EV-1 and EV-2 indicated in FIG. 3 are EV drive modes in which the engine 12 is held at rest while at least one of the first electric motor MG1 and second electric motor MG2 is used as a vehicle drive power source. The drive modes HV-1, HV-2 and HV-3 are hybrid drive modes (HV modes) in which the engine 12 is operated as the vehicle drive power source while the first electric motor MG1 and second electric motor MG2 are operated as needed to generate a vehicle drive force and/or an electric energy. In these hybrid drive modes, at least one of the first electric motor MG1 and second electric motor MG2 is operated to generate a reaction force or placed in a non-load free state.

As is apparent from FIG. 3, the EV drive modes of the drive system 10 in which the engine 12 is held at rest while at least one of the first electric motor MG1 and second electric motor MG2 is used as the vehicle drive power source consist of: a mode 1 (drive mode 1) in the form of the drive mode EV-1 which is established in the engaged state of the brake BK and in the released state of the clutch CL; and a mode 2 (drive mode 2) in the form of the drive mode EV-2 which is established in the engaged states of both of the brake BK and clutch CL. The hybrid drive modes in which the engine 12 is operated as the vehicle drive power source while the first electric motor MG1 and second electric motor MG2 are operated as needed to generate a vehicle drive force and/or an electric energy, consist of: a mode 3 (drive mode 3) in the form of the drive mode HV-1 which is established in the engaged state of the brake BK and in the released state of the clutch CL; a mode 4 (drive mode 4) in the form of the drive mode HV-2 which is established in the released state of the brake BK and in the engaged state of the clutch CL; and a mode 5 (drive mode 5) in the form of the drive mode HV-3 which is established in the released states of both of the brake BK and clutch CL.

FIGS. 4-7 are the collinear charts having straight lines which permit indication thereon of relative rotating speeds of the various rotary elements of the drive system 10 (first planetary gear set 14 and second planetary gear set 16), which rotary elements are connected to each other in different manners corresponding to respective combinations of the operating states of the clutch CL and brake BK. These collinear charts are defined in a two-dimensional coordinate system having a horizontal axis along which relative gear ratios ρ of the first and second planetary gear sets 14 and 16 are taken, and a vertical axis along which the relative rotating speeds are taken. The collinear charts indicated the relative rotating speeds when the output gear 30 is rotated in the positive direction to drive the hybrid vehicle in the forward direction. A horizontal line X1 represents the rotating speed of zero, while vertical lines Y1 through Y4 arranged in the order of description in the rightward direction represent the respective relative rotating speeds of the sun gear S1, sun gear S2, carrier C1 and ring gear R1. Namely, a solid line Y1 represents the relative rotating speed of the sun gear S1 of the first planetary gear set 14 (operating speed of the first electric motor MG1), a broken line Y2 represents the relative rotating speed of the sun gear S2 of the second planetary gear set 16 (operating speed of the second electric motor MG2), a solid line Y3 represents the relative rotating speed of the carrier C1 of the first planetary gear set 14 (operating speed of the engine 12), a broken line Y3' represents the relative rotating speed of the carrier C2 of the second planetary gear set 16, a solid line Y4 represents the relative rotating speed of the ring gear R1 of the first planetary gear set 14 (rotating speed of the output gear 30), and a broken line Y4' represents the relative rotating speed of the ring gear R2 of the second planetary gear set 16. In FIGS. 4-7, the vertical lines Y3 and Y3' are superimposed on each other, while the vertical lines Y4 and Y4' are superimposed on each other. Since the ring gears R1 and R2 are fixed to each other, the relative rotating speeds of the ring gears R1 and R2 represented by the vertical lines Y4 and Y4' are equal to each other.

In FIGS. 4-7, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2-Y4') are determined by the gear ratios ρ1 and ρ2 of the first and second planetary gear sets 14 and 16. Described more specifically, regarding the vertical lines Y1, Y3 and Y4 corresponding to the respective three rotary elements in the form of the sun gear S1, carrier C1 and ring gear R1 of the first planetary gear set 14, a distance between the vertical lines Y1 and Y3 corresponds to "1", while a distance between the vertical lines Y3 and Y4 corresponds to the gear ratio "ρ1". Regarding the vertical lines Y2, Y3' and Y4' corresponding to the respective three rotary elements in the form of the sun gear S2, carrier C2 and ring gear R2 of the second planetary gear set 16, a distance between the vertical lines Y2 and Y3' corresponds to "1", while a distance between the vertical lines Y3' and Y4' corresponds to the gear ratio "ρ2". In the drive system 10, the gear ratio ρ2 of the second planetary gear set 16 is higher than the gear ratio ρ1 of the first planetary gear set 14 (ρ2>ρ1). The drive modes of the drive system 10 will be described by reference to FIGS. 4-7.

The drive mode EV-1 indicated in FIG. 3 corresponds to the mode 1 (drive mode 1) of the drive system 10, which is preferably the EV drive mode in which the engine 12 is held at rest while the second electric motor MG2 is used as the vehicle drive power source. FIG. 4 is the collinear chart corresponding to the mode 1. Described by reference to this collinear chart, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 1, the rotating direction of the sun gear S2 and the rotating direction of the ring gear R2 in the second planetary gear set 16 are opposite to each other, so that when the second electric motor MG2 is operated to generate a negative torque (acting in the negative direction), the ring gear R2, that is, the output gear 30 is rotated in the positive direction by the generated negative torque. Namely, the hybrid vehicle provided with the drive system 10 is driven in the forward direction when the negative torque is generated by the second electric motor MG2. In this case, the first electric motor MG1 is preferably held in a free state. In this mode 1, the carriers C1 and C2 are permitted to be rotated relative to each other, so that the hybrid vehicle can be driven in the EV drive mode similar to an EV drive mode which is established in a vehicle provided with a so-called "THS" (Toyota Hybrid System) and in which the carrier C2 is fixed to the stationary member.

Figure 5:
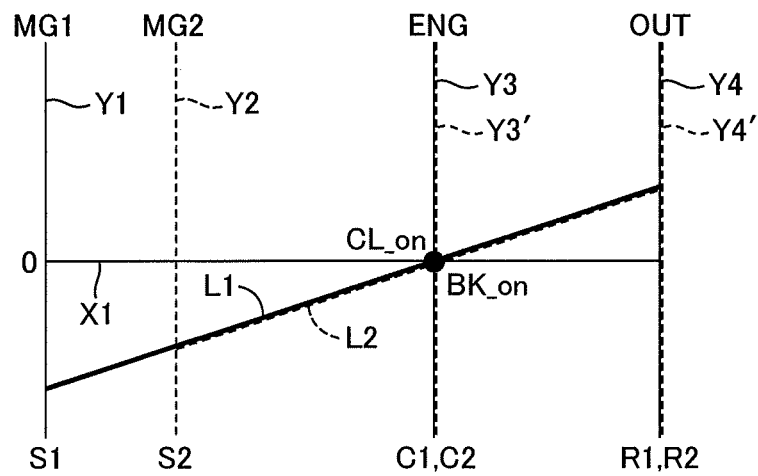
FIG. 5 is a collinear chart having straight lines which permit indication thereon of relative rotating speeds of various rotary elements of the drive system of FIG. 1, the collinear chart corresponding to the mode 2 of FIG. 3.

The drive mode EV-2 indicated in FIG. 3 corresponds to the mode 2 (drive mode 2) of the drive system 10, which is preferably the EV drive mode in which the engine 12 is held at rest while at least one of the first electric motor MG1 and second electric motor MG2 is used as the vehicle drive power source. FIG. 5 is the collinear chart corresponding to the mode 2. Described by reference to this collinear chart, the carrier C1 of the first planetary gear set 14 and the carrier C2 of the second planetary gear set 16 are not rotatable relative to each other in the engaged state of the clutch CL. Further, in the engaged state of the brake BK, the carrier C2 of the second planetary gear set 16 and the carrier C1 of the first planetary gear set 14 which is connected to the carrier C2 are coupled (fixed) to the stationary member in the form of the housing 26, so that the rotating speeds of the carriers C1 and C2 are held zero. In this mode 2, the rotating direction of the sun gear S1 and the rotating direction of the ring gear R1 in the first planetary gear set 14 are opposite to each other and the rotating direction of the sun gear S2 and the rotating direction of the ring gear R2 in the second planetary gear set 16 are opposite to each other, so that when the first electric motor MG1 and/or second electric motor MG2 is/are operated to generate a negative torque (acting in the negative direction), the ring gears R1 and R2 are rotated, that is, the output gear 30 is rotated in the positive direction by the generated negative torque. Namely, the hybrid vehicle provided with the drive system 10 is driven in the forward direction when the negative torque is generated by at least one of the first electric motor MG1 and second electric motor MG2.

In the mode 2, at least one of the first electric motor MG1 and second electric motor MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery. Namely, the mode 2 is an EV drive mode which may be established under various running conditions of the hybrid vehicle, or may be kept for a relatively long length of time. Accordingly, the mode 2 is advantageously provided on a hybrid vehicle such as a plug-in hybrid vehicle, which is frequently placed in an EV drive mode.

The drive mode HV-1 indicated in FIG. 3 corresponds to the mode 3 (drive mode 3) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 4 is the collinear chart corresponding to the mode 3. Described by reference to this collinear chart, the carrier C1 of the first planetary gear set 14 and the carrier C2 of the second planetary gear set 16 are rotatable relative to each other, in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In the present embodiment, this mode 3 corresponds to a first drive mode in which the engine 12 is operated in the engaged state of the brake BK and in the released state of the clutch CL. In this mode 3, the engine 12 is operated to generate an output torque by which the output gear 30 is rotated. At this time, the first electric motor MG1 is operated to generate a reaction torque in the first planetary gear set 14, so that the output of the engine 12 can be transmitted to the output gear 30. In the second planetary gear set 16, the rotating direction of the sun gear S2 and the rotating direction of the ring gear R2 are opposite to each other, in the engaged state of the brake BK, so that when the second electric motor MG2 is operated to generate a negative torque (acting in the negative direction), the ring gears R1 and R2 are rotated, that is, the output gear 30 is rotated in the positive direction by the generated negative torque.

Figure 6:
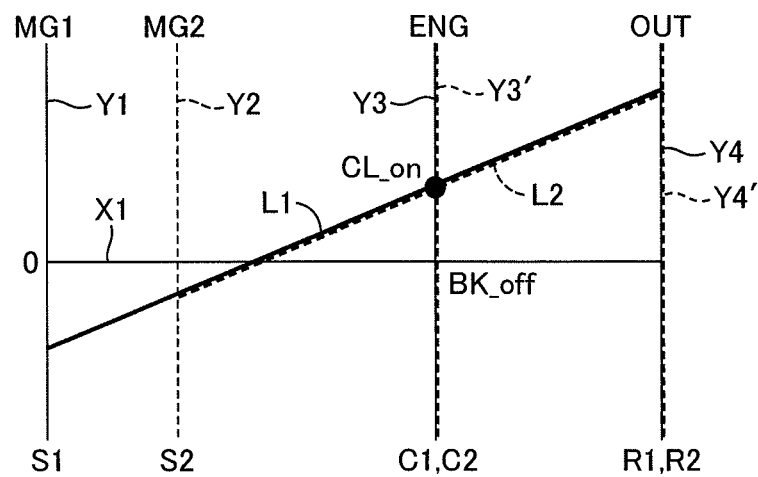
FIG. 6 is a collinear chart having straight lines which permit indication thereon of relative rotating speeds of various rotary elements of the drive system of FIG. 1, the collinear chart corresponding to the mode 4 of FIG. 3.

The drive mode HV-2 indicated in FIG. 3 corresponds to the mode 4 (drive mode 4) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 6 is the collinear chart corresponding to the mode 4. Described by reference to this collinear chart, the carrier C1 of the first planetary gear set 14 and the carrier C2 of the second planetary gear set 16 are not rotatable relative to each other, in the engaged state of the clutch CL, that is, the carriers C1 and C2 are integrally rotated as a single rotary element. The ring gears R1 and R2, which are fixed to each other, are integrally rotated as a single rotary element. In this embodiment, this mode 4 corresponds to a second drive mode in which the engine 12 is operated, in the released state of the brake BK and in the engaged state of the clutch CL. Namely, in the mode 4 of the drive system 10, the first planetary gear set 14 and second planetary gear set 16 function as a differential mechanism having a total of four rotary elements. That is, the drive mode 4 is a composite split mode in which the four rotary elements consisting of the sun gear S1 (connected to the first electric motor MG1), the sun gear S2 (connected to the second electric motor MG2), the rotary element constituted by the carriers C1 and C2 connected to each other (and to the engine 12), and the rotary element constituted by the ring gears R1 and R2 fixed to each other (and connected to the output gear 30) are connected to each other in the order of description in the rightward direction as seen in FIG. 6.

In the mode 4, the rotary elements of the first planetary gear set 14 and second planetary gear set 16 are preferably arranged as indicated in the collinear chart of FIG. 6, that is, in the order of the sun gear S1 represented by the vertical line Y1, the sun gear S2 represented by the vertical line Y2, the carriers C1 and C2 represented by the vertical line Y3 (Y3'), and the ring gears R1 and R2 represented by the vertical line Y4 (Y4'). The gear ratios $\rho 1$ and $\rho 2$ of the first and second planetary gear sets 14 and 16 are determined such that the vertical line Y1 corresponding to the sun gear S1 and the vertical line Y2 corresponding to the sun gear S2 are positioned as indicated in the collinear chart of FIG. 6, namely, such that the distance between the vertical lines Y1 and Y3 is longer than the distance between the vertical lines Y2 and Y3'. In other words, the distance between the vertical lines corresponding to the sun gear S1 and the carrier. C1 and the distance between the vertical lines corresponding to the sun gear S2 and the carrier C2 correspond to "1", while the distance between the vertical lines corresponding to the carrier C1 and the ring gear R1 and the distance between the vertical lines corresponding to the carrier C2 and the ring gear R2 correspond to the respective gear ratios $\rho 1$ and $\rho 2$. Accordingly, the drive system 10 is configured such that the gear ratio $\rho 2$ of the second planetary gear set 16 is higher than the gear ratio $\rho 1$ of the first planetary gear set 14.

In the mode 4, the carrier C1 of the first planetary gear set 14 and the carrier C2 of the second planetary gear set 16 are connected to each other in the engaged state of the clutch CL, so that the carriers C1 and C2 are rotated integrally with each other. Accordingly, either one or both of the first electric motor MG1 and second electric motor MG2 can generate a reaction force corresponding to the output of the engine 12. Namely, one or both of the first and second electric motors MG1 and MG2 can be operated to generate a reaction force or reaction forces during an operation of the engine 12, at an operating point assuring a relatively high degree of operating efficiency, and/or with a reduced degree of torque limitation due to heat generation.

For example, one of the first electric motor MG1 and second electric motor MG2 which is operable with a higher degree of operating efficiency is preferentially operated to generate a reaction force, so that the overall operating efficiency can be improved. When the hybrid vehicle is driven at a comparatively high running speed V and at a comparatively low engine speed $N_E$, for instance, the operating speed $N_{MG1}$ of the first electric motor MG1 may have a negative value, that is, the first electric motor MG1 may be operated in the negative direction. In the case where the first electric motor MG1 generates the reaction force acting on the engine 12, the first electric motor MG1 is operated in the negative direction so as to generate a negative torque with consumption of an electric energy, giving rise to a risk of reduction of the operating efficiency. In this respect, it will be apparent from FIG. 6 that in the drive system 10, the operating speed of the second electric motor MG2 indicated on the vertical line Y2 is less likely to have a negative value than the operating speed of the above-indicated first electric motor MG1 indicated on the vertical line Y1, and the second electric motor MG2 may possibly be operated in the positive direction, during generation of the reaction force. Accordingly, it is possible to improve the operating efficiency to improve the fuel economy, by preferentially controlling the second electric motor MG2 so as to generate the reaction force, while the operating speed of the first electric motor MG1 has a negative value. Further, where there is a torque limitation of one of the first electric motor MG1 and second electric motor MG2 due to heat generation, it is possible to ensure the generation of the reaction force required for the engine 12, by controlling the other electric motor so as to perform a regenerative operation or a vehicle driving operation, for providing an assisting vehicle driving force.

Figure 8:
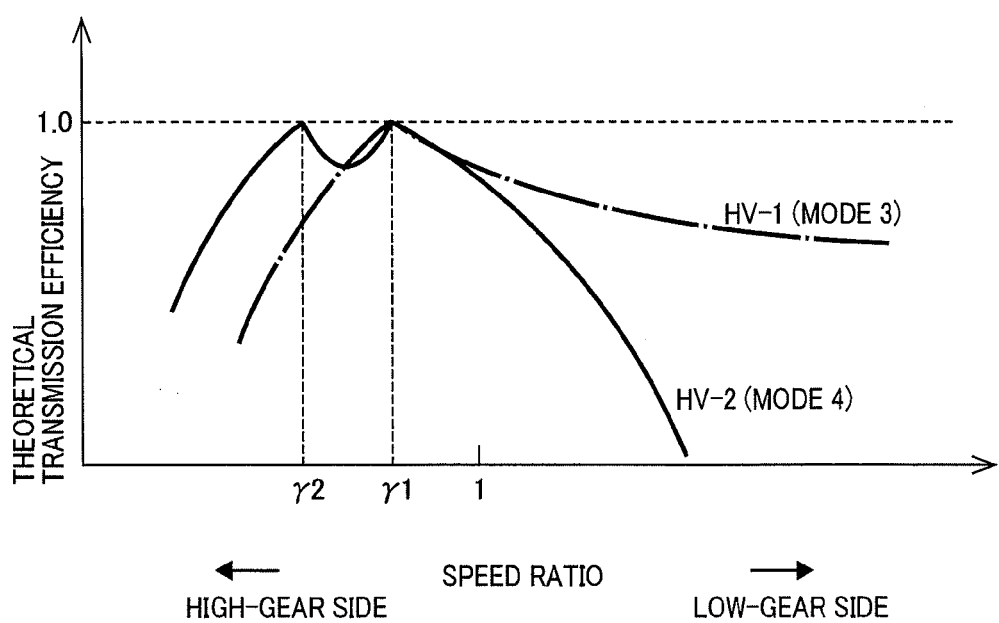
FIG. 8 is a view for explaining transmission efficiency of the drive system of FIG. 1.

FIG. 8 is the view for explaining transmission efficiency of the drive system 10, wherein the speed ratio is taken along the horizontal axis while theoretical transmission efficiency is taken along the vertical axis. The speed ratio indicated in FIG. 8 is a ratio of the input side speed of the first planetary gear set 14 and second planetary gear set 16 to the output side speed, that is, the speed reduction ratio, which is for example, a ratio of the rotating speed of the input rotary member in the form of the carrier C1 to the rotating speed of the output gear 30 (ring gears R1 and R2). The speed ratio is taken along the horizontal axis in FIG. 8 such that the left side as seen in the view of FIG. 8 is a side of high gear positions having comparatively low speed ratio values while the right side is a side of low gear positions having comparatively high speed ratio values. Theoretical transmission efficiency indicated in FIG. 8 is a theoretical value of the transmission efficiency of the drive system 10, which has a maximum value of 1.0 when an entirety of the drive force is mechanically transmitted from the first planetary gear set 14 and second planetary gear set 16 to the output gear 30, without transmission of an electric energy through the electric path.

In FIG. 8, a one-dot chain line represents the transmission efficiency of the drive system 10 placed in the mode 3 (HV-1), while a solid line represents the transmission efficiency in the mode 4 (HV-2). As indicated in FIG. 8, the transmission efficiency of the drive system 10 in the mode 3 (HV-1) has a maximum value at a speed ratio value γ1. At this speed ratio value γ1, the operating speed of the first electric motor MG1 (rotating speed of the sun gear S1) is zero, and an amount of an electric energy transmitted through the electric path is zero during generation of the reaction force, so that the drive force is only mechanically transmitted from the engine 12 and the second electric motor MG2 to the output gear 30, at an operating point corresponding to the speed ratio value γ1. This operating point at which the transmission efficiency is maximum while the amount of the electric energy transmitted through the electric path is zero will be hereinafter referred to as a "mechanical point (mechanical transmission point)". The speed ratio value γ1 is lower than "1", that is, a speed ratio on over drive side on the low-gear side, and will be hereinafter referred to as a "first mechanical transmission speed ratio value γ1". As indicated in FIG. 8, the transmission efficiency in the mode 3 gradually decreases with an increase of the speed ratio from the first mechanical transmission speed ratio value γ1 toward the low-gear side, and abruptly decreases with a decrease of the speed ratio from the first mechanical transmission speed ratio value γ1 toward the high-gear side.

In the mode 4 (HV-2) of the drive system 10, the gear ratios ρ1 and ρ2 of the first planetary gear set 14 and second planetary gear set 16 having the four rotary elements in the engaged state of the clutch CL are determined such that the operating speeds of the first electric motor MG1 and second electric motor MG2 are indicated at respective different positions along the horizontal axis of the collinear chart of FIG. 6, so that the transmission efficiency in the mode 4 has a maximum value at a mechanical point at a speed ratio value γ2, as well as at the speed ratio value γ1, as indicated in FIG. 8. Namely, in the mode 4, the rotating speed of the first electric motor MG1 is zero at the first mechanical transmission speed ratio value γ1 at which the amount of the electric energy transmitted through the electric path is zero during generation of the reaction force by the first electric motor MG1, while the rotating speed of the second electric motor MG2 is zero at the speed ratio value γ2 at which the amount of the electric energy transmitted through the electric path is zero during generation of the reaction force by the second electric motor MG2. The speed ratio value γ2 will be hereinafter referred to as a "second mechanical transmission speed ratio value γ2". This second mechanical transmission speed ratio value γ2 is smaller than the first mechanical transmission speed ratio value γ1. In the mode 4, the drive system 10 has the mechanical point located on the high-gear side of the mechanical point in the mode 3.

As indicated in FIG. 8, the transmission efficiency in the mode 4 more abruptly decreases with an increase of the speed ratio on a low-gear side of the first mechanical transmission speed ratio value γ1, than the transmission efficiency in the mode 3. In a region of the speed ratio between the first mechanical transmission speed ratio value γ1 and second mechanical transmission speed ratio value γ2, the transmission efficiency in the mode 4 changes along a concave curve. In this region, the transmission efficiency in the mode 4 is almost equal to or higher than that in the mode 3. The transmission efficiency in the mode 4 decreases with a decrease of the speed ratio from the second mechanical transmission speed ratio value γ2 toward the high-gear side, but is higher than that in the mode 3. That is, the drive system placed in the mode 4 has not only the first mechanical transmission speed ratio value γ1, but also the second mechanical transmission speed ratio value γ2 on the high-gear side of the first mechanical transmission speed ratio value γ1, so that the transmission efficiency of the drive system can be improved in high-gear positions having comparatively low speed ratio values. Thus, a fuel efficiency during running with relatively high speed is improved due to improvement of the transmission efficiency.

As described above referring to FIG. 8, the transmission efficiency of the drive system 10 during a hybrid running of the vehicle with an operation of the engine 12 used as the vehicle drive power source and operations of the first and second electric motors MG1 and MG2 as needed to generate a vehicle drive force and/or an electric energy can be improved by adequately switching the vehicle drive mode between the mode 3 (HV-1) and mode 4 (HV-2). For instance, the mode 3 is established in low-gear positions having speed ratio values lower than the first mechanical transmission speed ratio value γ1, while the mode 4 is established in high-gear positions having speed ratio values higher than the first mechanical transmission speed ratio value γ1, so that the transmission efficiency can be improved over a wide range of the speed ratio covering the low-gear region and the high-gear region.

Figure 7:
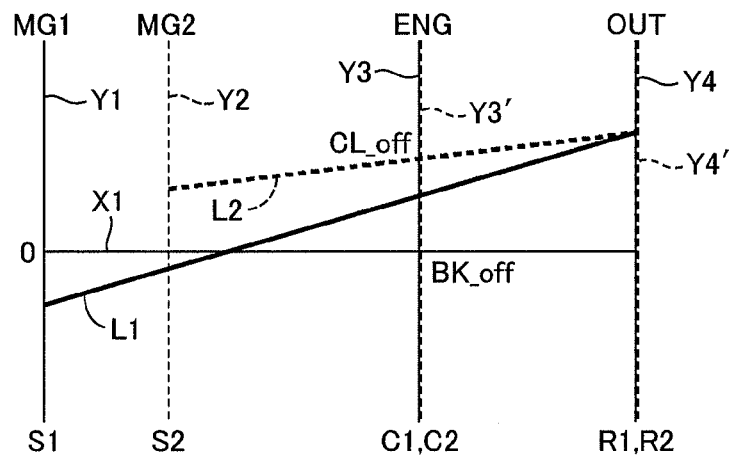
FIG. 7 is a collinear chart having straight lines which permit indication thereon of relative rotating speeds of various rotary elements of the drive system of FIG. 1, the collinear chart corresponding to the mode 5 of FIG. 3.

The drive mode EV-3 indicated in FIG. 3 corresponds to the mode 5 (drive mode 5) of the drive system 10, which is preferably the HV drive mode in which the engine 12 is operated as the vehicle drive power source while the first electric motor MG1 is operated as needed to generate a vehicle drive force and/or an electric energy. In this mode 5, the engine 12 and first electric motor MG1 may be operated to generate a vehicle drive force, with the second electric motor MG2 being disconnected from the drive line. FIG. 7 is the collinear chart corresponding to this mode 5. Described by reference to this collinear chart, the carrier C1 of the first planetary gear set 14 and the carrier C2 of the second planetary gear set 16 are rotatable relative to each other in the released state of the clutch CL. In the released state of the brake BK, the carrier C2 of the second planetary gear set 16 is rotatable relative to the stationary member in the form of the housing 26. In this arrangement, the second electric motor MG2 can be held at rest while it is disconnected from the drive line (power transmitting path).

In the mode 3 in which the brake BK is placed in the engaged state, the second electric motor MG2 is kept in an operated state together with a rotary motion of the output gear 30 (ring gear R2) during running of the vehicle. In this operating state, the operating speed of the second electric motor MG2 may reach an upper limit value (upper limit) during running of the vehicle at a comparatively high speed, or a rotary motion of the ring gear R2 at a high speed is transmitted to the sun gear S2. In this respect, it is not necessarily desirable to keep the second electric motor MG2 in the operated state during running of the vehicle at a comparatively high speed, from the standpoint of the operating efficiency. In the mode 5, on the other hand, the engine 12 and the first electric motor MG1 may be operated to generate the vehicle drive force during running of the vehicle at the comparatively high speed, while the second electric motor MG2 is disconnected from the drive line, so that it is possible to reduce a power loss due to dragging of the unnecessarily operated second electric motor MG2, and to eliminate a limitation of the highest vehicle running speed corresponding to the permissible highest operating speed (upper limit of the operating speed) of the second electric motor MG2.

It will be understood from the foregoing description, the drive system 10 is selectively placed in one of the three hybrid drive modes in which the engine 12 is operated as the vehicle drive power source, namely, in one of the drive mode HV-1 (mode 3), drive mode HV-2 (mode 4) and drive mode HV-3 (mode 5), which are selectively established by respective combinations of the engaged and released states of the clutch CL and brake BK. Accordingly, the transmission efficiency can be improved to improve the fuel economy of the vehicle, by selectively establishing one of the three hybrid drive modes according to the vehicle running speed and the speed ratio, in which the transmission efficiency is the highest.

Figure 9:
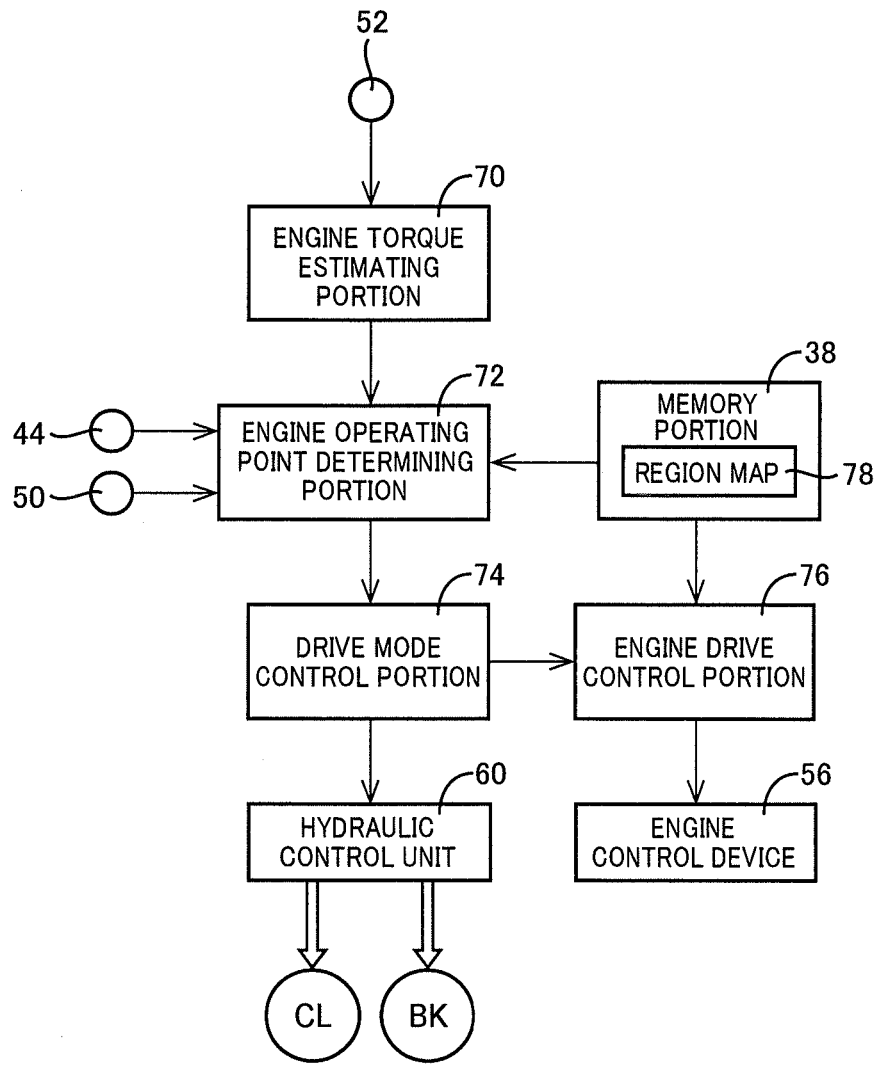
FIG. 9 is a functional block diagram for explaining major control functions of an electronic control device provided for the drive system of FIG. 1.

FIG. 9 is the functional block diagram for explaining major control functions of the electronic control device 40. An engine torque estimating portion 70 shown in FIG. 9 is configured to estimate an engine torque $T_E$ generated by the engine 12. Preferably, the engine torque estimating portion 70 estimates (calculates) the engine torque $T_E$ generated by the engine 12, on the basis of the intake air quantity $Q_A$ of the engine 12 detected by the intake air quantity sensor 52, and according to a predetermined relationship. Alternatively, the engine torque estimating portion 70 may estimate the engine torque $T_E$ on the basis of the opening angle $\theta_{TH}$ of the electronic throttle valve disposed in an intake pipe of the engine 12, or the engine speed $N_E$ detected by the engine speed sensor 44, or any other value relating to the engine speed $N_E$.

An engine operating point determining portion 72 is configured to determine whether an operating point of the engine 12 lies in a predetermined region. The operating point of the engine 12, which is defined by the engine torque $T_E$ and the engine speed $N_E$, for example, corresponds to an operating state of the engine 12 which determines the fuel economy of the engine 12 and the frequency of a rotary motion pulsation of the engine 12 to be transmitted to the drive system 10. The engine operating point determining portion 72 determines whether the operating point of the engine 12 lies in the region which is obtained by experimentation based on the actual operating points of the engine 12 and which is stored in a memory portion 38. This determination and the region used for the determination will be described in detail by reference to FIGS. 10-12.

Figure 10:
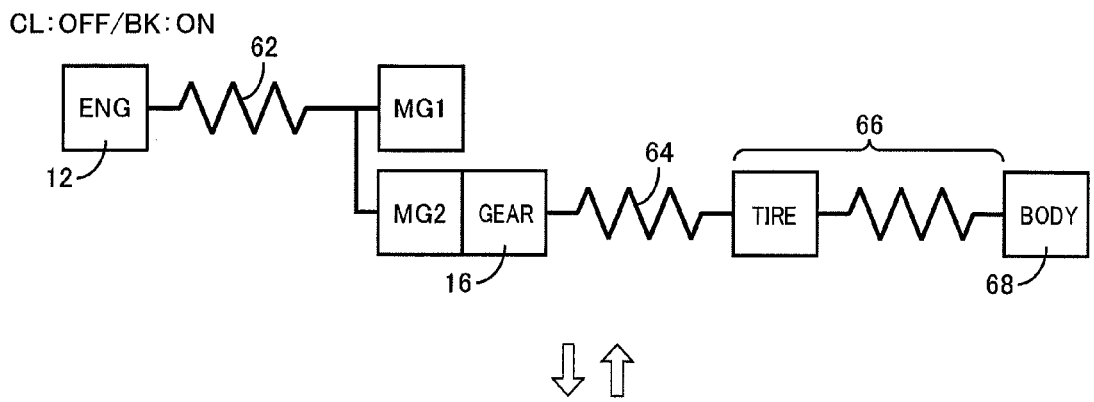
FIG. 10 is a view schematically illustrating characteristics of the power transmitting system in the drive system of FIG. 1, which change depending upon the operating state of at least one of the clutch and brake.
Figure 10:
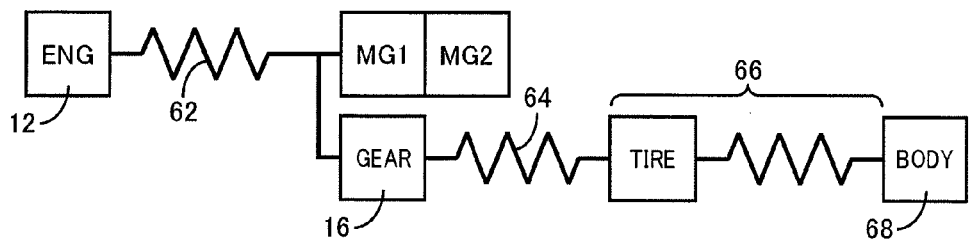

FIG. 10 is the view schematically illustrating characteristics of the power transmitting system in the drive system 10, which change depending upon the operating state of at least one of the clutch CL and the brake BK. In the drive system 10, the power transmitting system has different characteristics such as the resonance frequency depending upon whether the drive system 10 is placed in the first drive mode in the form of the mode 3 (HV-1) or the second drive mode in the form of the mode 4 (HV-2). The term "power transmitting system" is interpreted to mean a device/devices concerning power transmission from the vehicle drive power source to the drive wheels, namely, a so-called "drive line". In the hybrid vehicle provided with the drive system 10, the power transmitting system is a power transmitting device including the above-described first planetary gear set 14, second planetary gear set 16, input shaft 28, output gear 30 and damper 62, and a drive shaft 64, a tire 66 and a body 68 (see FIG. 10), which are disposed in a power transmitting path from the vehicle drive power source in the form of the engine 12, first electric motor MG1 and second electric motor MG2, to each of the drive wheels in the form of the tire 66.

In the drive system 10, its resonance point (resonance frequency) changes depending upon whether the clutch CL is placed in the engaged state or the released state, while the brake BK is placed in the released state. Namely, the second electric motor MG2 is not connected to the power transmitting system between the engine 12 and the first electric motor MG1, in the released state of the clutch CL. When the clutch CL is switched from the released state to the engaged state, the second electric motor MG2 is connected to the power transmitting system between the engine 12 and the first electric motor MG1. Accordingly, the components such as the rotor 24 of the second electric motor MG2 are added to the power transmitting system, so that the resonance point of the power transmitting system is changed as a result of a change of the characteristic relating to the inertia (inertia balance).

Figure 11:
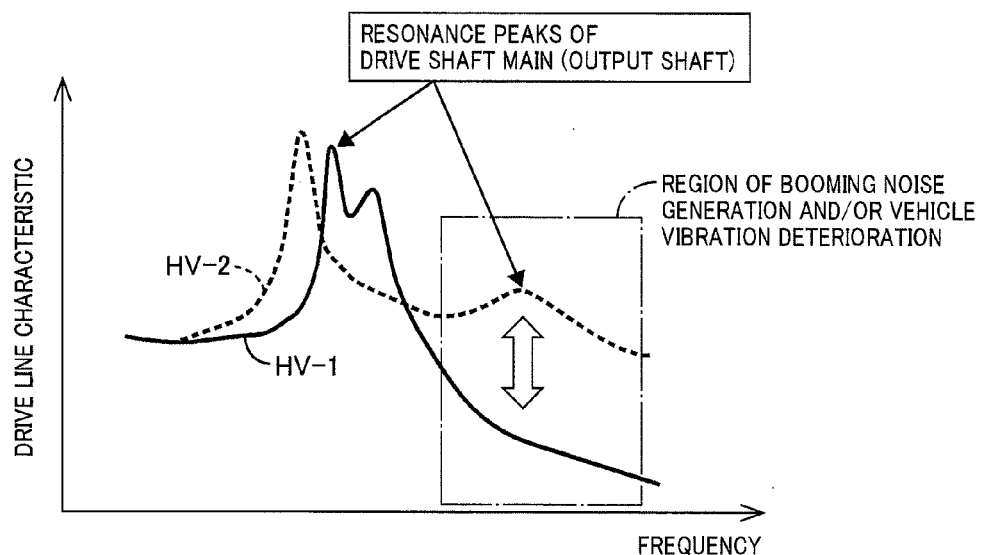
FIG. 11 is a view schematically illustrating different characteristics (resonance frequency characteristics) of the power transmitting system in the drive system of FIG. 1, which correspond to the respective different operating states of the clutch and brake.

An upper part of FIG. 10 shows the condition in which the clutch CL is placed in the released state while the brake BK is placed in the engaged state, that is, in which the mode 3 (HV-1) indicated in FIG. 3 is established, while a lower part of FIG. 10 shows the condition in which the clutch CL is placed in the engaged state while the brake BK is placed in the released state, that is, in which the mode 4 (HV-2) indicated in FIG. 3 is established. FIG. 11 is the view schematically illustrating the different characteristics (resonance frequency characteristics) of the power transmitting system, which correspond to the respective different operating states of the clutch CL and the brake BK. The view indicates resonance peaks around the drive shaft 64 in the output line of the drive system 10, that is, in the power transmitting path from the gear 16 to the body 68. In FIG. 11, a solid line represents the characteristic in the released state of the clutch CL and in the engaged state of the brake BK, that is, in the mode 3, while a broken line represents the characteristic in the engaged state of the clutch CL and in the released state of the brake BK, that is, in the mode 4. The second electric motor MG2 is not connected to the power transmitting system between the engine 12 and the first electric motor MG1, in the released state of the clutch CL and in the engaged state of the brake BK, that is, when the mode 3 (HV-1) indicated in FIG. 3 is established, as indicated in the upper part of FIG. 10. The second electric motor MG2 is connected to an output-side power transmitting system including the drive shaft 64, tire 66 and body 68, through the second planetary gear set 16 and the output gear 30. That is, the second electric motor MG2 is connected to the output-side power transmitting system. In the engaged state of the clutch CL and in the released state of the brake BK, that is, when the mode 4 (HV-2) indicated in FIG. 3 is established, on the other hand, the second electric motor MG2 is connected to the power transmitting system between the engine 12 and the first electric motor MG1, as indicated in the lower part of FIG. 10. Namely, the second electric motor MG2 is connected to an input-side power transmitting system. Accordingly, the resonance point of the power transmitting system is changed as a result of a change of the characteristic relating to the inertia (inertia balance), as indicated in FIG. 11.

In FIG. 11, an area enclosed by a one-dot chain line indicates a region of frequency in which there is a high probability of generation of a booming noise and/or deterioration of vibrations of the hybrid vehicle ("booming noise generation/vehicle vibration deterioration region"), when the drive system 10 is placed in the mode 4 (HV-2). The drive system 10 has a risk of generation of the booming noise and/or deterioration of the vehicle vibrations, where the frequency of the rotary motion pulsation of the engine 12 is coincident with the resonance frequency of the power transmitting system. When the drive system 10 is placed in the mode 4, that is, in the condition indicated in the lower part of FIG. 10, the region in which there is the high probability of generation of the booming noise and/or deterioration of the vehicle vibrations exists on a relatively high frequency side as shown in FIG. 11. Namely, when the drive system 10 is placed in the mode 4, the inertia of the second electric motor MG2 is transferred from the output line, that is, from the power transmitting path from the gear 16 to the body 68 indicated in FIG. 10, to the input line, that is, to the power transmitting path from the engine 12 to the first electric motor MG1 indicated in FIG. 10. As a result, the inertia in the output line is reduced, so that the drive line characteristic is deteriorated in the frequency band in which the drive line characteristic principally depends upon the output line. In other words, when the drive system 10 is switched to the mode 4, the drive line characteristic tends to be deteriorated in the relatively high frequency band in which the drive line characteristic depends upon the output line, so that there exists a high risk of generation of the booming noise and/or deterioration of the vehicle vibrations, in the relatively high frequency band.

Figure 12:
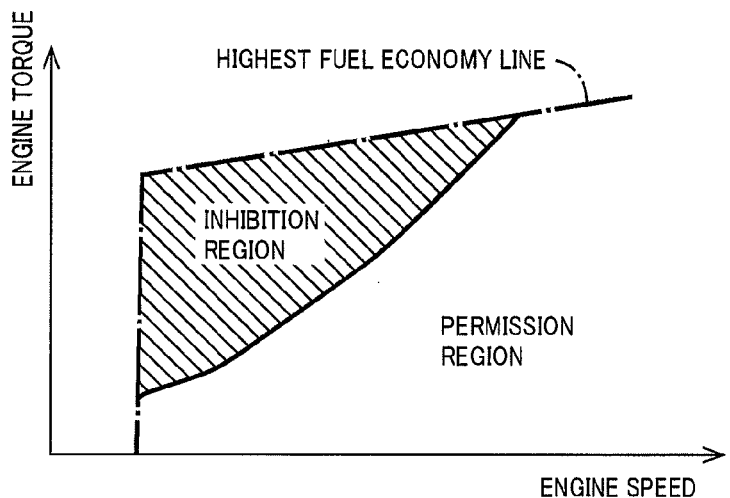
FIG. 12 is a view showing one example of a region map defining a region in which the drive system in FIG. 1 is inhibited from being placed in the mode 4 indicated in FIG. 3.

FIG. 12 is the view showing one example of a region map 78 which is stored in the memory portion 38 and which defines the region in which the drive system 10 is inhibited from being placed in the mode 4 (HV-2). In FIG. 12, the region of the operating point of the engine 12 in which the drive system 10 is inhibited from being placed in the mode 4 is indicated by an area of inclined hatching lines labeled as "inhibition region", while the region in which the drive system 10 is permitted to be placed in the mode 4 is indicated by an area labeled as "permission region". These inhibition and permission regions are positioned relative to each other such that the inhibition region is located on a higher engine torque side than the permission region, at the same value of the engine speed $N_E$, and on a lower engine speed side than the permission region, at the same value of the engine torque. In FIG. 12, a one-dot chain line represents a highest fuel economy line of the engine 12. This highest fuel economy line is a curve connecting highest fuel economy engine operating points of iso-fuel economy curves, which are obtained by experimentation with a rise of the engine speed $N_E$. In other words, the highest fuel economy curve is a series of the highest fuel economy engine operating points of the engine 12, which are obtained by experimentation so as to obtain a best compromise between the vehicle drivability and the fuel economy, at those highest fuel economy engine operating points.

Preferably, the inhibition region of the operating points of the engine 12 which is defined by the region map 78 and in which the drive system 10 is inhibited from being placed in the mode 4 is the region of the operating points of the engine 12 in which the booming noise and/or the vehicle vibrations is/are generated when the engine 12 is operated in the mode 4 of the drive system 10. Namely, the region of the operating points of the engine 12 is obtained by experimentation such that the booming noise and/or the vehicle vibrations is/are generated when the operating point of the engine 12 lies in the obtained region in the engaged state of the clutch CL and in the released state of the brake BK. The region map 78 is formulated to define the thus obtained region as the "inhibition region". For instance, the frequency band which is enclosed by the one-dot chain line in FIG. 11 and in which there is a high probability of generation of the booming noise and/or deterioration of the vehicle vibrations when the drive system 10 is placed in the mode 4 corresponds to the region of the operating points of the engine 12 in which the booming noise and/or the vehicle vibrations is/are generated during operation of the engine 12.

The engine operating point determining portion 72 shown in FIG. 9 determines whether the operating point of the engine 12 lies in the region in which the drive system is inhibited from being placed in the mode 4. For instance, the engine operating point determining portion 72 determines whether the operating point of the engine 12 lies in the "inhibition region" defined by the region map 78 described above by reference to FIG. 12, on the basis of the engine torque $T_E$ estimated by the engine torque estimating portion 70 and the engine speed $N_E$ detected by the engine speed sensor 44. The engine operating point determining portion 72 determines whether the operating point of the engine 12 lies in the region in which the drive system is permitted to be placed in the mode 4. For instance, the engine operating point determining portion 72 determines whether the operating point of the engine 12 lies in the "permission region" of the region map 78 described above by reference to FIG. 12.

Preferably, the region map 78 is formulated such that the "inhibition region" in which the drive system is inhibited from being placed in the mode 4 (HV-2) is narrowed with a rise of the engine speed $N_E$, as indicated in FIG. 12. In other words, the region map 78 is formulated such that the range of the engine torque $T_E$ corresponding to the inhibition region is narrowed with a rise of the engine speed $N_E$. Further, the region map 78 is formulated such that when the engine speed $N_E$ is higher than a predetermined upper limit, the operating point of the engine 12 lies in the "permission region" in which the drive system is permitted to be placed in the mode 4, irrespective of the engine torque $T_E$. In this respect, it is noted that the engine speed $N_E$ generally rises with a rise of the vehicle running speed V. For this reason, the engine operating point determining portion 72 may be configured to make the determination as to whether the operating point of the engine 12 lies in the region of inhibition of the mode 4, on the basis of the vehicle running speed V and according to a predetermined relationship. In this case, the relationship used to define the region of inhibition of the mode 4 is preferably predetermined on the basis of the vehicle running speed V and is stored in the memory portion 38, and the engine operating point determining portion 72 makes the determination as to whether the operating point of the engine 12 lies in the region of inhibition of the mode 4, on the basis of the vehicle running speed V and according to the predetermined relationship. Alternatively, the engine operating point determining portion 72 may be configured to make the determination on the basis of a required vehicle drive force (a required value of the vehicle drive force) depending on the accelerator pedal operation amount $A_{CC}$ detected by the accelerator pedal operation amount sensor 42.

A drive mode control portion 74 shown in FIG. 9 is configured to determine the drive mode of the drive system 10 to be established, and controls the operating states of the clutch CL and the brake BK so as to place the drive system 10 in the determined drive mode. The drive mode control portion 74 is basically configured to determine one of the drive modes 1-5 of the drive system 10 to be established, on the basis of the accelerator pedal operation amount $A_{CC}$ detected by the accelerator pedal operation amount sensor 42, the vehicle running speed V corresponding to the output speed $N_{OUT}$ detected by the output speed sensor 50, the electric energy amount SOC of the battery detected by the battery SOC sensor 54, etc., and according to a predetermined relationship. The drive mode control portion 74 places the drive system in the determined drive mode by controlling the operating states of the clutch CL and the brake BK. Further, the drive mode control portion 74 controls the operations of the first electric motor MG1 and the second electric motor MG2 through the inverter 58, and controls the operation of the engine 12 through an engine drive control portion 76 which will be described.

The drive mode control portion 74 inhibits the drive system 10 from being placed in the mode 4 (HV-2) or permits the drive system 10 to be placed in the mode 4, depending upon a result of the determination by the engine operating point determining portion 72. Namely, the drive mode control portion 74 inhibits the drive system 10 from being placed in the mode 4, if the engine operating point determining portion 72 has determined that the operating point of the engine 12 lies in the region of inhibition of the mode 4, for instance, in the "inhibition region" indicated in FIG. 12. Since the region map 78 defines the region of inhibition or permission of the mode 4, the drive system is permitted to be placed in the mode 3, irrespective of the relationship of the engine operating point with the region map 78. Namely, the drive system is permitted to be placed in the mode 3 (HV-1) even when the engine operating point lies in the "inhibition region" indicated in FIG. 12. In other words, the operating point of the engine 12 may lie in the region in which the drive mode control portion 74 establishes the mode 3, but does not establish the mode 4. Namely, the drive system 10 is configured to be placed in the mode 3 and the mode 4 in the respective different regions of the operating point of the engine 12.

The engine drive control portion 76 shown in FIG. 9 is configured to control the operation of the engine 12 through the engine control device 56. Described more specifically, the engine drive control portion 76 controls the operating point of the engine 12 represented by the engine speed $N_E$ and the engine torque $T_E$, by commanding the engine control device 56 to control an amount of supply of a fuel by a fuel injecting device into the intake pipe, a timing of ignition of the engine 12 by an igniting device, and the opening angle $θ_{TH}$ of the electronic throttle valve. Preferably, the engine drive control portion 76 controls the operation of the engine 12 such that the operating point of the engine 12 lies outside the "inhibition region" defined by the region map 78, when the drive system 10 is placed in the mode 4 (HV-2). In other words, the engine drive control portion 76 controls the operation of the engine 12 such that the operating point of the engine 12 lies in the "permission region" defined by the region map 78, when the drive system 10 is placed in the mode 4.

Figure 13:
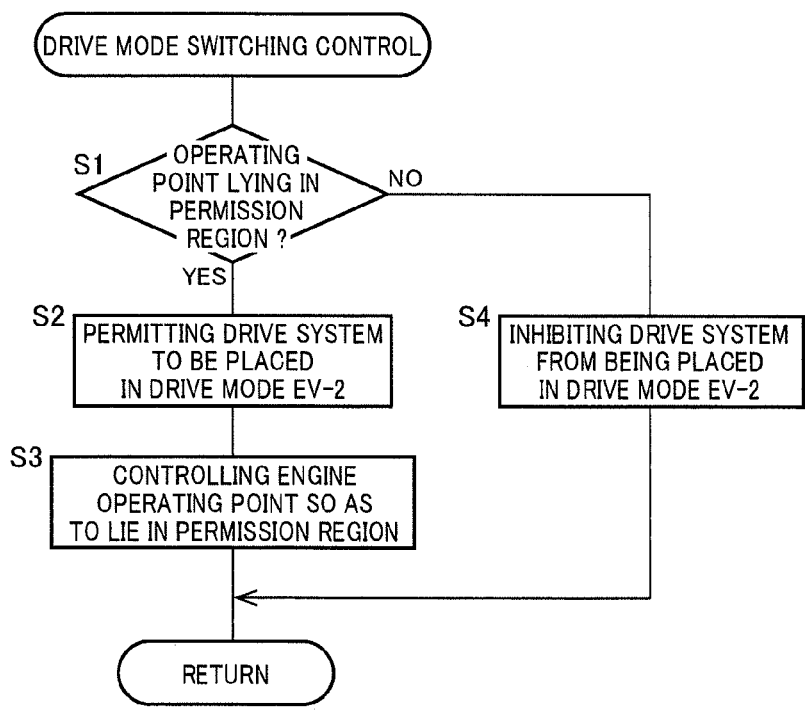
FIG. 13 is a flow chart for explaining a major portion of a drive mode switching control implemented by the electronic control device provided for the drive system of FIG. 1.

FIG. 13 is the flow chart for explaining a major portion of a drive mode switching control implemented by the electronic control device 40. This drive mode switching control is repeatedly implemented with a predetermined cycle time.

The drive mode switching control is initiated with step S1 ("step" being hereinafter omitted) to determine whether the operating point of the engine 12 represented by the engine speed $N_E$ and the engine torque $T_E$ lies in the predetermined "permission region" defined by the region map 78, in which the booming noise will not be generated. If an affirmative determination is obtained in S1, the control flow goes to S2 to permit the drive system 10 to be placed in the mode 4 (HV-2). Then, the control flow goes to S3 to control the operation of the engine 12 such that the operating point of the engine 12 lies in the "permission region" defined by the region map 78. Then, the present control routine is terminated. If a negative determination is obtained in S1, the control flow goes to S4 to inhibit the drive system 10 from being placed in the mode 4, and the control routine is terminated. It will be understood from the foregoing description of the drive mode switching control that S1 corresponds to the operations of the engine torque estimating portion 70 and the engine operating point determining portion 72, and S2 and S4 correspond to the operation of the drive mode control portion 74, while S3 corresponds to the operation of the engine drive control portion 76.

Other preferred embodiments of the present invention will be described in detail by reference to the drawings. In the following description, the same reference signs will be used to identify the same elements in the different embodiments, which will not be described redundantly.

Second Embodiment

Figure 14:
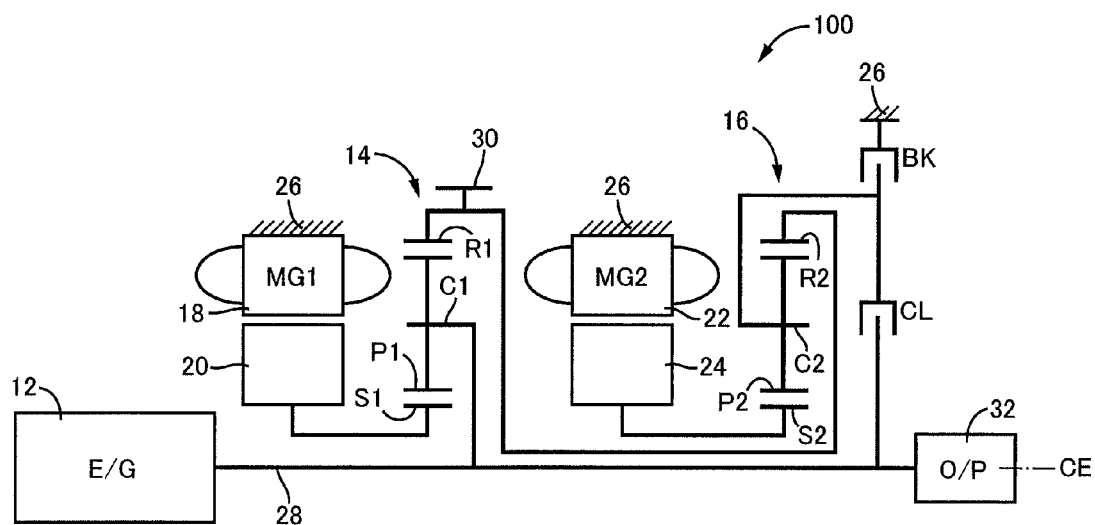
FIG. 14 is a schematic view for explaining an arrangement of a hybrid vehicle drive system according to another preferred embodiment of this invention.

FIG. 14 is the schematic view for explaining an arrangement of a hybrid vehicle drive system 100 (hereinafter referred to simply as a "drive system 100") according to another preferred embodiment of this invention. In this drive system 100 shown in FIG. 14, the second planetary gear set 16, clutch CL and brake BK are disposed on one side of the first planetary gear set 14 remote from the engine 12, such that the second electric motor MG2 is interposed between the first planetary gear set 14, and the second planetary gear set 16, clutch CL and brake BK, in the axial direction of the center axis CE. Preferably, the clutch CL and brake BK are disposed at substantially the same position in the axial direction of the center axis CE. That is, the drive system 100 is configured such that the first electric motor MG1, first planetary gear set 14, second electric motor MG2, second planetary gear set 16, clutch CL, and brake BK are disposed coaxially with each other, in the order of description from the side of the engine 12, in the axial direction of the center axis CE. The hybrid vehicle drive control device according to the present invention is equally applicable to the present drive system 100 configured as described above.

Third Embodiment

Figure 15:
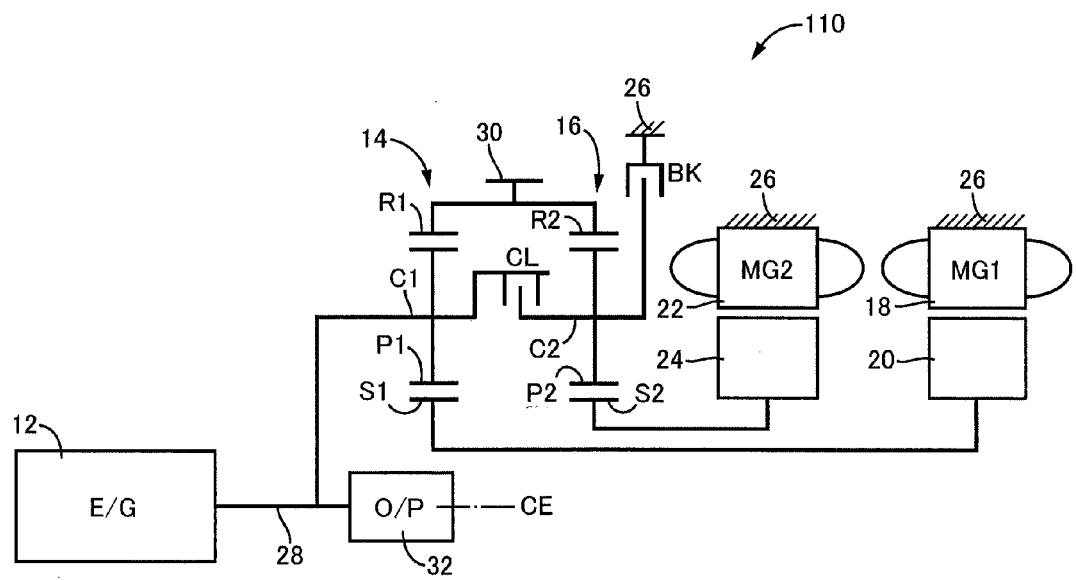
FIG. 15 is a schematic view for explaining an arrangement of a hybrid vehicle drive system according to a further preferred embodiment of this invention.

FIG. 15 is a schematic view for explaining an arrangement of a hybrid vehicle drive system 110 (hereinafter referred to simply as a "drive system 110") according to a further preferred embodiment of this invention. In this drive system 110 shown in FIG. 15, the first planetary gear set 14, clutch CL, second planetary gear set 16 and brake BK which constitute a mechanical system are disposed on the side of the engine 12, while the first electric motor MG1 and second electric motor MG2 which constitute an electric system are disposed on one side of the mechanical system remote from the engine 12. That is, the drive system 110 is configured such that the first planetary gear set 14, clutch CL, second planetary gear set 16, brake BK, second electric motor MG2, and first electric motor MG1 are disposed coaxially with each other, in the order of description from the side of the engine 12, in the axial direction of the center axis CE. The hybrid vehicle drive control device according to the present invention is equally applicable to the present drive system 110 configured as described above.

Fourth Embodiment

Figure 16:
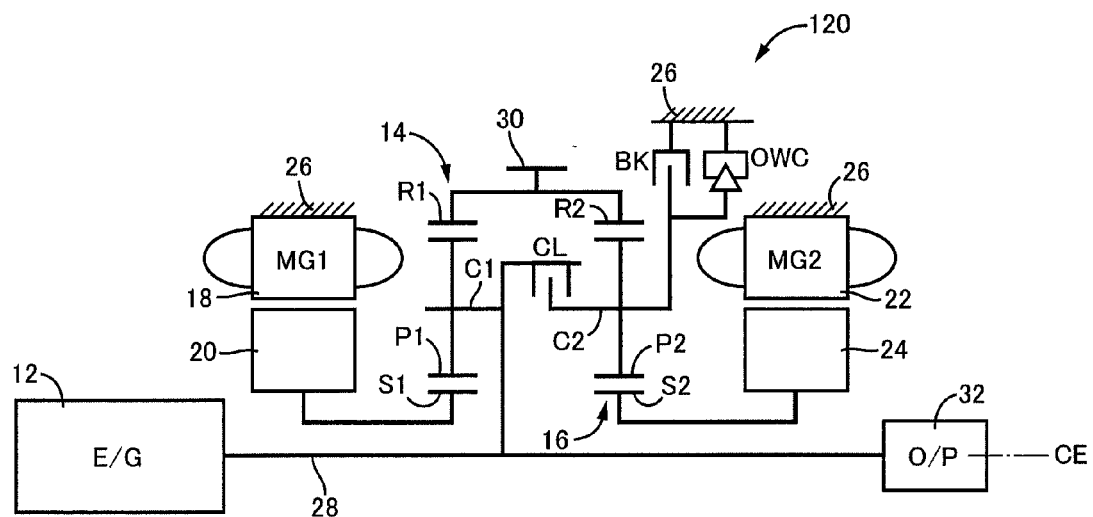
FIG. 16 is a schematic view for explaining an arrangement of a hybrid vehicle drive system according to a still further preferred embodiment of this invention.

FIG. 16 is the schematic view for explaining an arrangement of a hybrid vehicle drive system 120 (hereinafter referred to simply as a "drive system 120") according to a still further preferred embodiment of this invention. In this drive system 120 shown in FIG. 16, a one-way clutch OWC is disposed in parallel with the brake BK, between the carrier C2 of the second planetary gear set 16 and the stationary member in the form of the above-indicated housing 26. The one-way clutch OWC permits a rotary motion of the carrier C2 in one of opposite directions relative to the housing 26, and inhibits a rotary motion of the carrier C2 in the other direction. Preferably, this one-way clutch OWC permits the rotary motion of the carrier C2 in the positive or forward direction relative to the housing 26, and inhibits the rotary motion of the carrier C2 in the negative or reverse direction. Namely, in a drive state where the carrier C2 is rotated in the negative direction, that is, the second electric motor MG2 is operated to generate a negative torque, for example, the modes 1-3 can be established without the engaging action of the brake BK. The hybrid vehicle drive control device according to the present invention is equally applicable to the present drive system 120 configured as described above.

Fifth Embodiment

Figure 17:
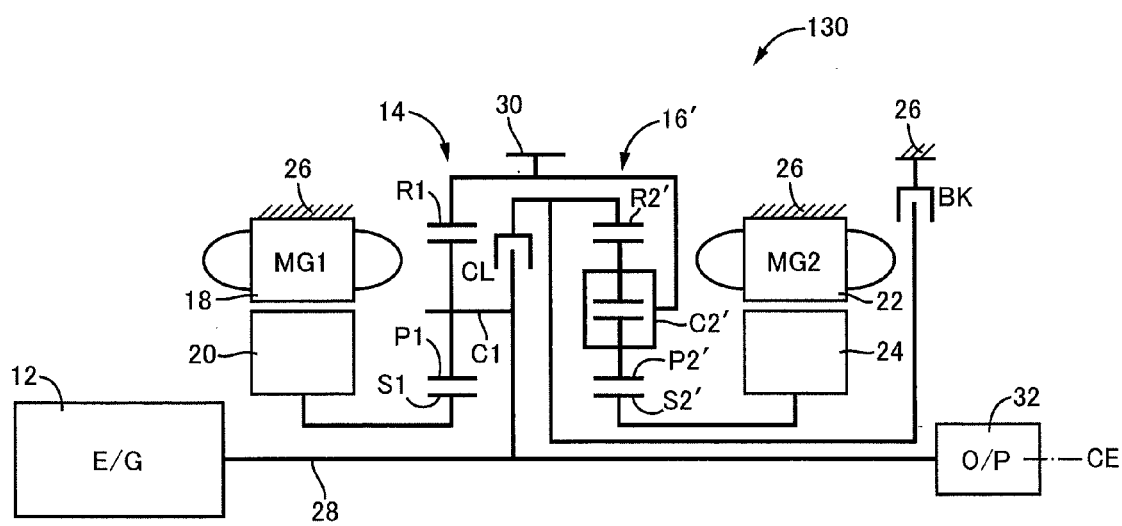
FIG. 17 is a schematic view for explaining an arrangement of a hybrid vehicle drive system according to a yet further preferred embodiment of this invention.

FIG. 17 is the schematic view for explaining an arrangement of a hybrid vehicle drive system 130 (hereinafter referred to simply as a "drive system 130") according to a yet further preferred embodiment of this invention. This drive system 130 shown in FIG. 17 is provided with a second differential mechanism in the form of a double-pinion type second planetary gear set 16' disposed on the center axis CE, in place of the single-pinion type second planetary gear set 16. This second planetary gear set 16' is provided with rotary elements (elements) consisting of; a first rotary element in the form of a sun gear S2'; a second rotary element in the form of a carrier C2' supporting a plurality of pinion gears P2' meshing each other such that each pinion gear P2' is rotatable about its axis and the axis of the planetary gear set; and a third rotary element in the form of a ring gear R2' meshing with the sun gear S2' through the pinion gears P2'.

The ring gear R1 of the first planetary gear set 14 is connected to the output rotary member in the form of the output gear 30, and to the carrier C2 of the second planetary gear set 16'. The sun gear S2' of the second planetary gear set 16' is connected to the rotor 24 of the second electric motor MG2. Between the carrier C1 of the first planetary gear set 14 and the ring gear R2' of the second planetary gear set 16', there is disposed the clutch CL which is configured to selectively couple these carrier C1 and ring gear R2' to each other (to selectively connect the carrier C1 and ring gear R2' to each other or disconnect the carrier C1 and ring gear R2' from each other). Between the ring gear R2' of the second planetary gear set 16' and the stationary member in the form of the housing 26, there is disposed the brake BK which is configured to selectively couple (fix) the ring gear R2' to the housing 26.

As shown in FIG. 17, the drive system 130 is configured such that the first planetary gear set 14 and second planetary gear set 16' are disposed coaxially with the input shaft 28, and opposed to each other in the axial direction of the center axis CE. Namely, the first planetary gear set 14 is disposed on one side of the second planetary gear set 16' on the side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16' which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16' are interposed between the first electric motor MG1 and second electric motor MG2. That is, the drive system 130 is configured such that the first electric motor MG1, first planetary gear set 14, clutch CL, second planetary gear set 16', second electric motor MG2, and brake BK are disposed coaxially with each other, in the order of description from the side of the engine 12, in the axial direction of the center axis CE. The hybrid vehicle drive control device according to the present invention is equally applicable to the present drive system 130 configured as described above.

Sixth Embodiment

Figure 18:
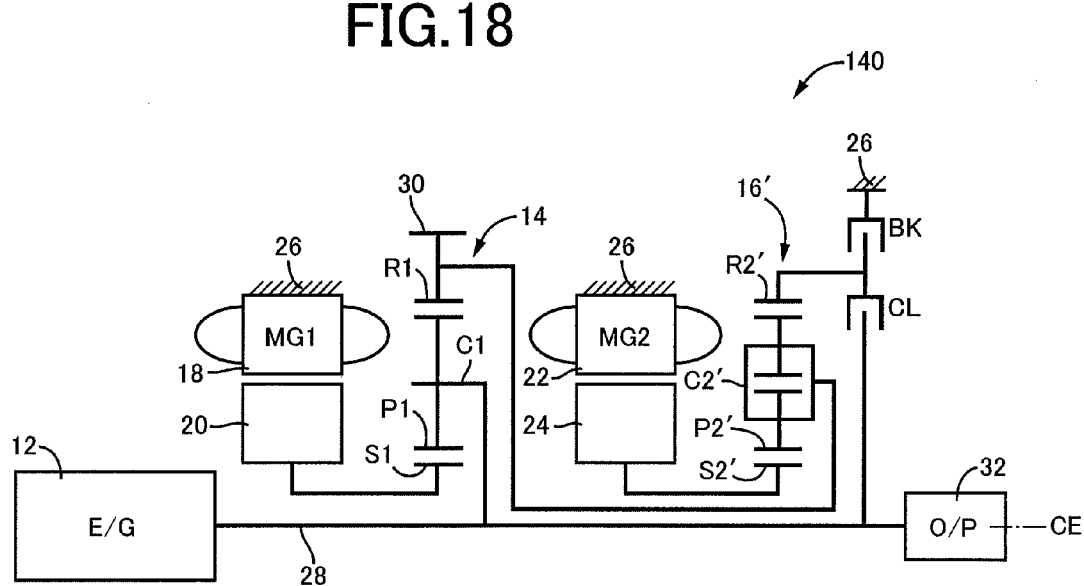
FIG. 18 is a schematic view for explaining an arrangement of a hybrid vehicle drive system according to still another preferred embodiment of this invention.

FIG. 18 is the schematic view for explaining an arrangement of a hybrid vehicle drive system 140 (hereinafter referred to simply as a "drive system 140" according to still another preferred embodiment of this invention. In this drive system 140 shown in FIG. 18, the second planetary gear set 16', clutch CL and brake BK are disposed on one side of the first planetary gear set 14 remote from the engine 12, such that the second electric motor MG2 is interposed between the first planetary gear set 14, and the second planetary gear set 16', clutch CL and brake BK, in the axial direction of the center axis CE. Preferably, the clutch CL and brake BK are disposed at substantially the same position in the axial direction of the center axis CE. That is, the drive system 140 is configured such that the first electric motor MG1, first planetary gear set 14, second electric motor MG2, second planetary gear set 16', clutch CL, and brake BK are disposed coaxially with each other, in the order of description from the side of the engine 12, in the axial direction of the center axis CE. The hybrid vehicle drive control device according to the present invention is equally applicable to the present drive system 140 configured as described above.

Seventh Embodiment

Figure 19:
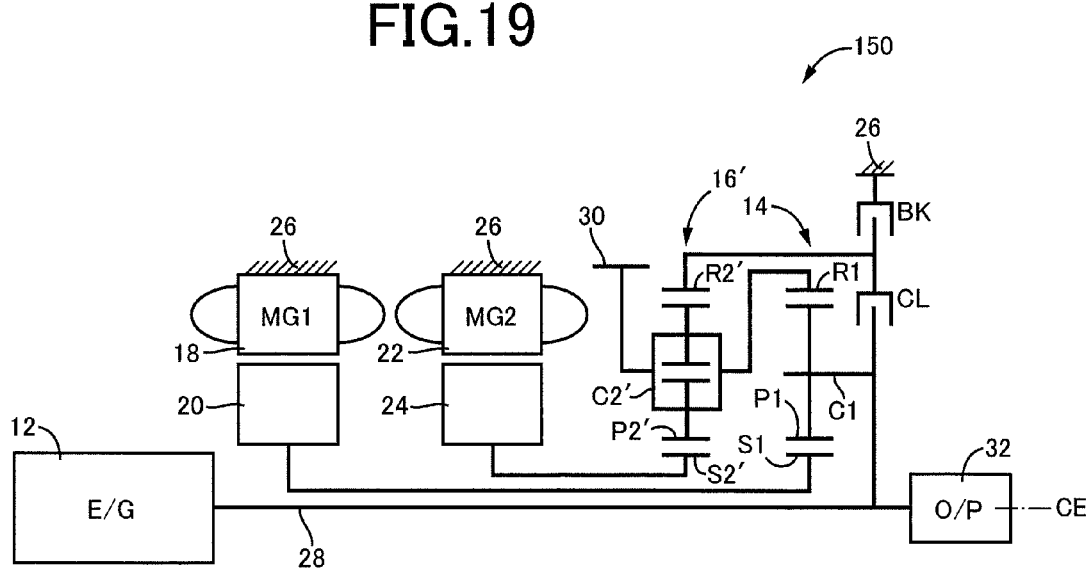
FIG. 19 is a schematic view for explaining an arrangement of a hybrid vehicle drive system according to yet another preferred embodiment of this invention.

FIG. 19 is the schematic view for explaining an arrangement of a hybrid vehicle drive system 150 (hereinafter referred to simply as a "drive system 150") according to yet another preferred embodiment of this invention. In this drive system 150 shown in FIG. 19, the first electric motor MG1 and second electric motor MG2 which constitute an electric system are disposed on the side of the engine 12, while the second planetary gear set 16', first planetary gear set 14, clutch CL, and brake BK which constitute a mechanical system are disposed on one side of the electric system remote from the engine 12. That is, the drive system 150 is configured such that the first electric motor MG1, second electric motor MG2, second planetary gear set 16', first planetary gear set 14, clutch CL, and brake BK are disposed coaxially with each other, in the order of description from the side of the engine 12, in the axial direction of the center axis CE. The hybrid vehicle drive control device according to the present invention is equally applicable to the present drive system 150 configured as described above.

The hybrid vehicle according to the embodiment described above is provided with: the first differential mechanism in the form of the first planetary gear set 14 having the first rotary element in the form of the sun gear S1 connected to the first electric motor MG1, the second rotary element in the form of the carrier C1 connected to the engine 12, and the third rotary element in the form of the ring gear R1 connected to the output rotary member in the form of the output gear 30; the second differential mechanism in the form of the second planetary gear set 16 (16') having the first rotary element in the form of the sun gear 52 (S2') connected to the second electric motor MG2, the second rotary element in the form of the carrier C2 (C2'), and the third rotary element in the form of the ring gear R2 (R2'), one of the carrier C2 (C2') and the ring gear R2 (R2') being connected to the ring gear R1 of the first planetary gear set 14; the clutch CL configured to selectively couple the carrier C1 of the first planetary gear set 14, and the other of the carrier C2 (C2') and the ring gear R2 (R2') which is not connected to the ring gear R1, to each other; and the brake BK configured to selectively couple the other of the carrier C2 (C2') and the ring gear R2 (R2') which is not connected to the ring gear R1, to the stationary member in the form of the housing 26. The drive control device places the hybrid vehicle selectively in the mode 3 (HV-1) in the form of the first drive mode in which the engine 12 is operated, in the engaged state of the brake BK and in the released state of the clutch CL, and the mode 4 (HV-2) in the form of the second drive mode in which the engine 12 is operated, in the released state of the brake BK and in the engaged state of the clutch CL, and inhibits the hybrid vehicle from being placed in the mode 4 when the operating point of the engine 12 lies in the predetermined "inhibition region", but permits the hybrid vehicle to be placed in the mode 3 when the operating point of the engine 12 lies in the predetermined "inhibition region". Thus, the drive control device is configured to select the drive mode so as to reduce the generation of noises and vibrations, while taking account of different conditions of the inertia balance depending upon the operating states of the clutch CL and brake BK. Namely, the present embodiment provides the drive control device in the form of the electronic control device 40 for the hybrid vehicle, which permits reduction of generation of noises and vibrations of the hybrid vehicle.

The above-described "inhibition region" is the region of the operating point of the engine 12 in which the noises and/or the vibrations are generated during an operation of the engine 12 while the drive system is placed in the mode 4 and is preliminary obtained by experimentation. Accordingly, it is possible to suitably and practically set the region in which the drive system is inhibited from being placed in the mode 4, in order to reduce generation of the noises and vibrations.

The operation of the engine 12 is controlled such that the operating point of the engine 12 lies outside the above-described "inhibition region", where the drive system is permitted to be placed in the above-described mode 4. Accordingly, it is possible to suitably reduce generation of the noises and vibrations due to the operation of the engine 12 where the drive system is permitted to be placed in the mode 4.

The drive system is controlled such that the hybrid vehicle is placed in the mode 3 and the mode 4 in the respective different regions of the operating point of the engine. Thus, the drive control device is configured to select the drive mode so as to reduce the generation of noises and vibrations, while taking account of different conditions of the inertia balance depending upon the operating states of the clutch CL and brake BK. Namely, the present embodiment provides the drive control device in the form of the electronic control device 40 for the hybrid vehicle, which permits reduction of generation of noises and vibrations of the hybrid vehicle.

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS 10, 100, 110, 120, 130, 140, 150: Hybrid vehicle drive system
12: Engine    14: First planetary gear set (First differential mechanism)
16, 16': Second planetary gear set (Second differential mechanism)
18, 22: Stator    20, 24: Rotor    26: Housing (Stationary member)
28: Input shaft    30: Output gear (Output rotary member)
32: Oil pump    38: Memory portion
40: Electronic control device (Drive control device)
42: Accelerator pedal operation amount sensor    44: Engine speed sensor
46: MG1 speed sensor    48: MG2 speed sensor    50: Output speed sensor
52: Intake air quantity sensor    54: Battery SOC sensor
56: Engine control device    58: Inverter    60: Hydraulic control unit
62: Damper    64: Drive shaft    66: Tire    68: Body
70: Engine torque estimating portion
72: Engine operating point determining portion
74: Drive mode control portion    76: Engine drive control portion
78: Region map    BK: Brake    CL: Clutch
C1, C2, C2': Carrier (Second rotary element)
MG1: First electric motor    MG2: Second electric motor
OWC: One-way clutch    P1, P2, P2': Pinion gear
R1, R2, R2': Ring gear (Third rotary element)
S1, S2, S2': Sun gear (First rotary element)

The invention claimed is:

1. A drive control device for a hybrid vehicle which is provided with:
- a first differential mechanism and a second differential mechanism which have a total of five rotary elements; and
- an engine, a first electric motor, a second electric motor and an output rotary member which are respectively connected to four rotary elements of said five rotary elements, and
- which has at least a first drive mode and a second drive mode in which the engine is operated and
- which are established by selectively connecting a rotary element of said five rotary elements which is connected to said engine, and
- a rotary element of said five rotary elements which is not connected to any of said engine, said first electric motor, said second electric motor and said output rotary member, to each other through a clutch, or selectively fixing the rotary element connected to said engine, and
- the rotary element not connected to any of said engine, said first electric motor, said second electric motor and said output rotary member, to a stationary member through a brake,
- the drive control device comprising:
  - a drive mode control portion configured to place the hybrid vehicle selectively in the first drive mode in which said engine is operated, in an engaged state of said brake and in a released state of said clutch, and the second drive mode in which said engine is operated, in a released state of said brake and in an engaged state of said clutch,
  - said drive mode control portion
    - inhibiting the hybrid vehicle from being placed in said second drive mode when an operating point of said engine lies in a predetermined region, and
    - permitting the hybrid vehicle to be placed in said first drive mode when the operating point of the engine lies in said predetermined region.

2. The drive control device according to claim 1, further comprising memory portion storing a region map which defines said predetermined region, as a region of the operating point of said engine in which at least one of a noise and a vibration is/are generated due to an operation of said engine while the hybrid vehicle is placed in said second drive mode.

3. The drive control device according to claim 1, further comprising an engine drive control portion configured to control an operation of said engine such that the operating point of said engine lies outside said predetermined region, where the hybrid vehicle is permitted to be placed in said second drive mode.

4. A drive control device for a hybrid vehicle which is provided with:
- a first differential mechanism and a second differential mechanism which have a total of five rotary elements; and
- an engine, a first electric motor, a second electric motor and an output rotary member which are respectively connected to four rotary elements of said five rotary elements, and
- which has at least a first drive mode and a second drive mode in which the engine is operated and
- which are established by selectively connecting a rotary element of said five rotary elements which is connected to said engine, and
- a rotary element of said five rotary elements which is not connected to any of said engine, said first electric motor, said second electric motor and said output rotary member, to each other through a clutch, or selectively fixing the rotary element connected to said engine, and
- the rotary element not connected to any of said engine, said first electric motor, said second electric motor and said output rotary member, to a stationary member through a brake,
- the drive control device comprising:
  - a drive mode control portion configured to place the hybrid vehicle selectively in the first drive mode in which said engine is operated, in an engaged state of said brake and in a released state of said clutch, and the second drive mode in which said engine is operated, in a released state of said brake and in an engaged state of said clutch,
  - said drive mode control portion controlling the hybrid vehicle during forward running thereof such that the hybrid vehicle is placed in said first drive mode and said second drive mode in respective different regions of an operating point of the engine.

5. A drive control device for a hybrid vehicle which is provided with:
- a first differential mechanism and a second differential mechanism which have a total of five rotary elements; and
- an engine, a first electric motor, a second electric motor and an output rotary member which are respectively connected to four rotary elements of said five rotary elements, and
- which has at least a first drive mode and a second drive mode in which the engine is operated and
- which are established by selectively connecting a rotary element of said five rotary elements which is connected to said engine, and
- a rotary element of said five rotary elements which is not connected to any of said engine, said first electric motor, said second electric motor and said output rotary member, to each other through a clutch, or selectively fixing the rotary element connected to said engine, and
- the rotary element not connected to any of said engine, said first electric motor, said second electric motor and said output rotary member, to a stationary member through a brake,
- the drive control device comprising:
  - a memory portion storing a predetermined relationship according to which said first drive mode, said second drive mode and an operating point of said engine are selected and
  - a drive mode control portion configured to switch a drive mode of the hybrid vehicle from said second drive mode to said first drive mode, where the operating point of said engine while said second drive mode is selected lies in a predetermined region in which a booming noise is generated, said second drive mode is switched to said first drive mode.

6. The drive control device according to claim 5, wherein said predetermined relationship is defined by at least one of an operation amount of an accelerating member manually operated by an operator of the hybrid vehicle, a running speed of the hybrid vehicle and an electric energy amount stored in a battery.

* * * * *